(12) United States Patent
Tsubusaki

(10) Patent No.: US 11,128,805 B2
(45) Date of Patent: *Sep. 21, 2021

(54) ZOOM CONTROL DEVICE, ZOOM CONTROL METHOD, CONTROL PROGRAM, AND IMAGING APPARATUS EQUIPPED WITH ZOOM CONTROL DEVICE

(71) Applicant: CANON KABUSHIKI KAISHA, Tokyo (JP)

(72) Inventor: Akihiro Tsubusaki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/842,588

(22) Filed: Apr. 7, 2020

(65) Prior Publication Data
US 2020/0236287 A1    Jul. 23, 2020

Related U.S. Application Data

(63) Continuation of application No. 16/043,803, filed on Jul. 24, 2018, now Pat. No. 10,652,473.

(30) Foreign Application Priority Data

Jul. 28, 2017    (JP) .............................. JP2017-146776

(51) Int. Cl.
*H04N 5/232* (2006.01)
*G06T 5/00* (2006.01)

(52) U.S. Cl.
CPC ........... *H04N 5/23296* (2013.01); *G06T 5/00* (2013.01); *H04N 5/23218* (2018.08);
(Continued)

(58) Field of Classification Search
CPC .......... H04N 5/23296; H04N 5/23218; H04N 5/232123; H04N 5/23245; H04N 5/23219; G06T 5/00; G06T 2210/22
See application file for complete search history.

(56) References Cited

U.S. PATENT DOCUMENTS

| 7,936,384 | B2 * | 5/2011 | Sawachi | ................ H04N 5/232 348/240.1 |
| 2005/0219393 | A1* | 10/2005 | Sugimoto | .......... H04N 5/23293 348/333.01 |

(Continued)

FOREIGN PATENT DOCUMENTS

| JP | 2008-27401 A | 2/2008 |
| JP | 2009-117960 A | 5/2009 |

(Continued)

*Primary Examiner* — Abdelaaziz Tissire
(74) *Attorney, Agent, or Firm* — Canon U.S.A., Inc. IP Division

(57) ABSTRACT

An apparatus for recording an image output from a sensor based on an instruction from a user includes a detection unit configured to detect a subject from an image output from the sensor, and a control unit configured to set a parameter based on the detected subject and to perform automatic optical zoom control using the parameter. In a first mode, the detection unit detects a subject from a first image which is acquired after a predetermined condition is satisfied after the instruction, and the control unit performs the automatic optical zoom control using the parameter set based on the subject detected from the first image.

21 Claims, 13 Drawing Sheets

(52) U.S. Cl.
CPC ..... *H04N 5/23219* (2013.01); *H04N 5/23245* (2013.01); *H04N 5/232123* (2018.08); *G06T 2210/22* (2013.01)

(56) References Cited

U.S. PATENT DOCUMENTS

| | | | | |
|---|---|---|---|---|
| 2008/0025558 | A1* | 1/2008 | Nozawa | H04N 1/3875 382/100 |
| 2008/0316325 | A1* | 12/2008 | Nakahara | H04N 5/232127 348/222.1 |
| 2009/0015658 | A1* | 1/2009 | Enstad | H04N 7/142 348/14.08 |
| 2009/0303342 | A1* | 12/2009 | Corcoran | G06K 9/00255 348/222.1 |
| 2009/0322906 | A1* | 12/2009 | Watanabe | H04N 1/00331 348/231.99 |
| 2010/0238321 | A1* | 9/2010 | Honjo | G03B 17/14 348/231.99 |
| 2010/0315525 | A1* | 12/2010 | Ikeda | G03B 17/18 348/222.1 |
| 2011/0149120 | A1* | 6/2011 | Kubota | H04N 5/23219 348/240.99 |
| 2011/0243538 | A1* | 10/2011 | Morimoto | H04N 5/23296 396/77 |
| 2012/0133822 | A1* | 5/2012 | Kawai | H04N 5/23212 348/347 |
| 2013/0027510 | A1* | 1/2013 | Tsubusaki | H04N 5/23212 348/36 |
| 2013/0108122 | A1* | 5/2013 | Ptucha | H04N 5/2355 382/118 |
| 2014/0176612 | A1* | 6/2014 | Tamura | G06T 3/40 345/660 |

FOREIGN PATENT DOCUMENTS

| | | |
|---|---|---|
| JP | 2012-124771 A | 6/2012 |
| JP | 2016-122030 A | 7/2016 |

* cited by examiner

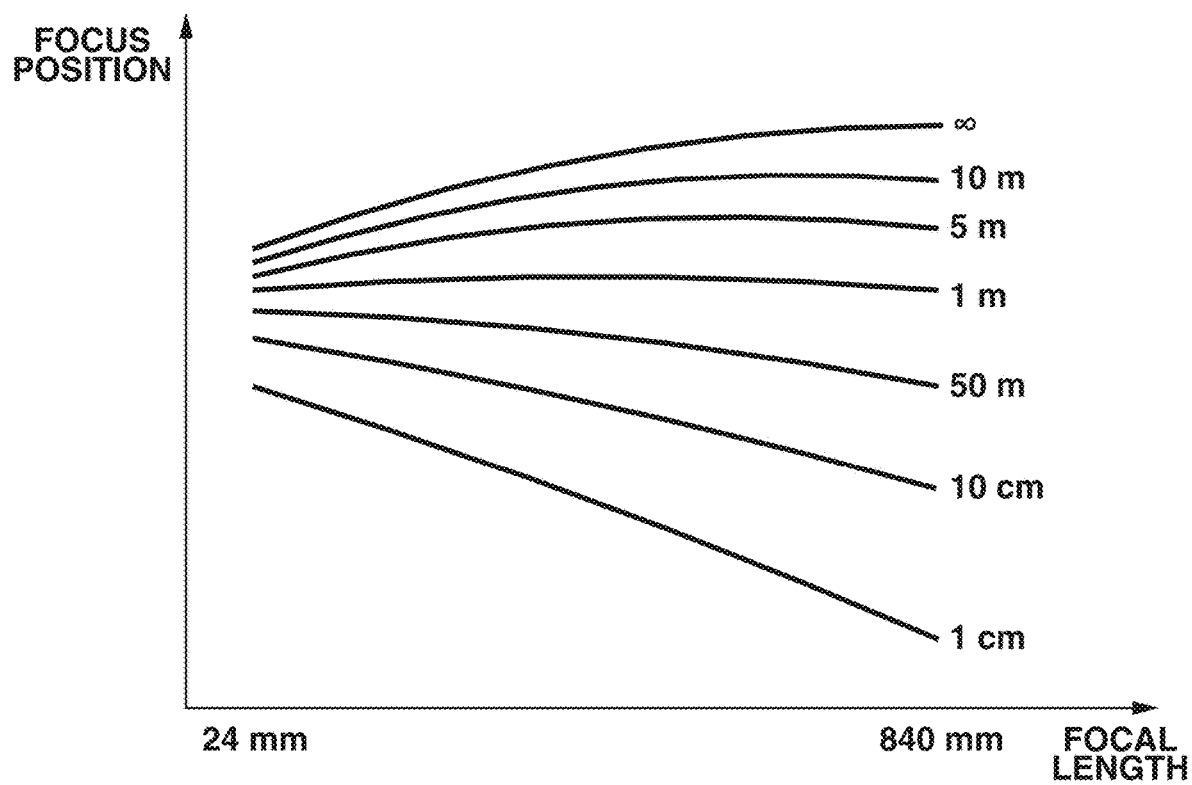

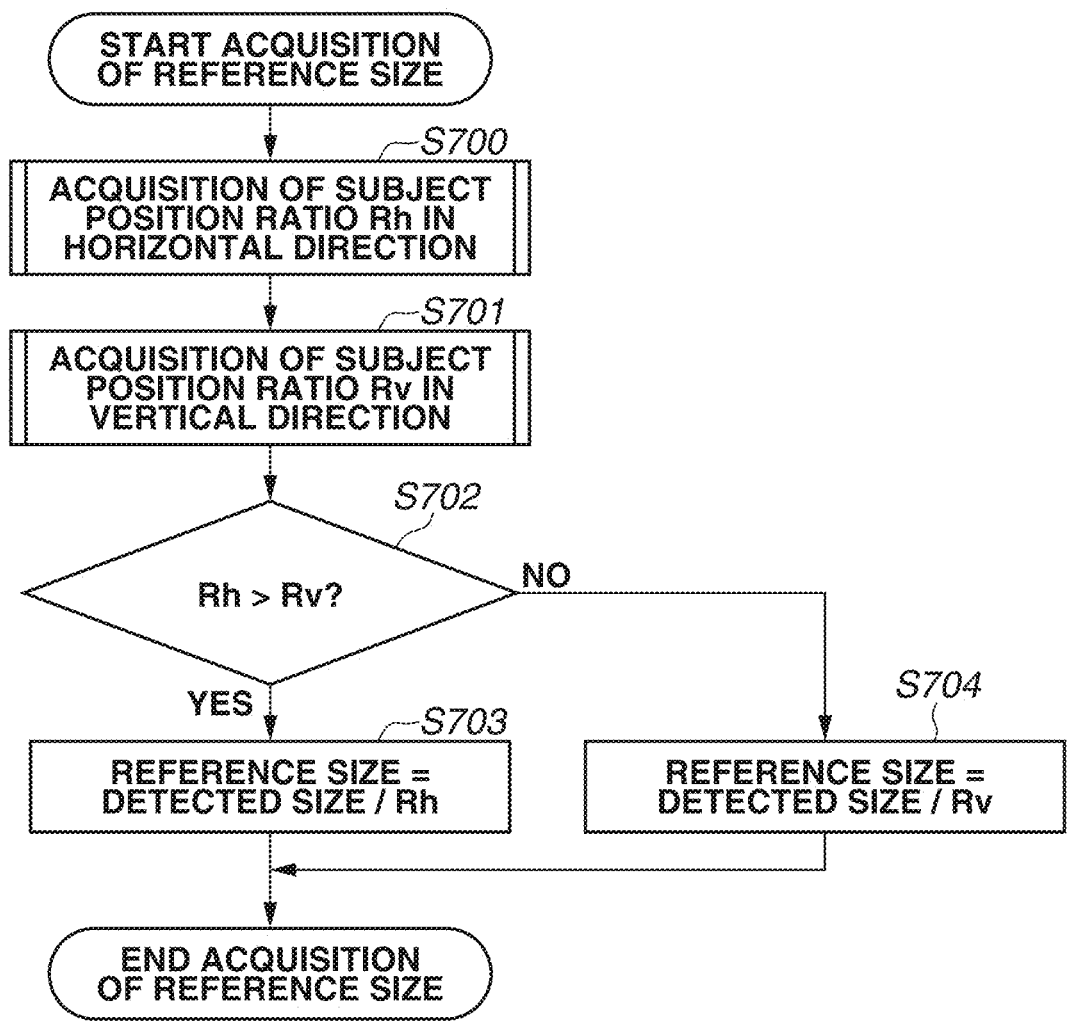

ZOOM CONTROL DEVICE, ZOOM CONTROL METHOD, CONTROL PROGRAM, AND IMAGING APPARATUS EQUIPPED WITH ZOOM CONTROL DEVICE

CROSS-REFERENCE TO RELATED APPLICATION

This application is a Continuation of U.S. application Ser. No. 16/043,803, filed Jul. 24, 2018, which claims priority from Japanese Patent Application No. 2017-146776 filed Jul. 28, 2017, which are hereby incorporated by reference herein in their entireties.

BACKGROUND OF THE INVENTION

Field of the Invention

Aspects of the embodiments generally relate to techniques concerning a zoom control device and a zoom control method for controlling a zoom operation.

Description of the Related Art

Heretofore, there is known an imaging apparatus which has an automatic shutter (automatic image capturing) function to automatically perform image capturing based on information about a subject detected in an image plane during self-timer image capturing.

Japanese Patent Application Laid-Open No. 2012-124771 discusses the configuration of a camera equipped with an automatic shutter function to automatically perform image capturing in response to a subject being detected in a predetermined region during self-timer image capturing.

Moreover, there is known an imaging apparatus which has an automatic zoom function to automatically change the zoom position according to detected information about a subject using optical zoom, which is accompanied by driving of a zoom lens, and electronic zoom, which enlarges the center area of a captured image. Hereinafter, an optical zoom operation and an electronic zoom operation are collectively referred to as a "zoom operation".

Japanese Patent Application Laid-Open No. 2016-122030 discusses the configuration of a camera equipped with an automatic zoom function to maintain the size of a subject image to a constant size. Japanese Patent Application Laid-Open No. 2016-122030 discusses a method of performing automatic zoom control based on a reference size set with respect to the number of subjects or the position of a subject in an image plane and a selected composition in such a manner that the size of a detected subject becomes equal to the reference size.

Furthermore, with regard to the function of performing electronic clipping and enlargement with respect to a given region of a captured image (hereinafter referred to as "electronic cropping"), there is an imaging apparatus which has an automatic cropping (automatic clipping) function to automatically change a clipping region according to detected information about a subject.

SUMMARY OF THE INVENTION

According to an aspect of the embodiments, an apparatus for recording an image output from a sensor based on an instruction from a user includes a detection unit configured to detect a subject from image output from the sensor, and a control unit configured to set a parameter based on the detected subject and to perform automatic optical zoom control using the parameter, wherein, in a first mode, the detection unit detects a subject from a first image which is acquired after a predetermined condition is satisfied after the instruction, and the control unit performs the automatic optical zoom control using the parameter set based on the subject detected from the first image.

With regard to image capturing using a camera discussed in Japanese Patent Application Laid-Open No. 2012-124771, to take, for example, a group photograph using a self-timer, the user is required to adjust an image capturing range by adjusting the orientation or zoom of the camera. Therefore, in particular, in a case where the place where the camera is located relative to a subject is limited, the user is required to perform a troublesome operation for image capturing. For example, in a case where the camera is allowed to be located only at a place distant from a subject, the user is required to adjust an angle of view by manually performing a zoom operation, or, in a case where the camera is allowed to be located only at a position lower or a position higher than a subject, the user is required to adjust an image capturing range by titling the camera.

Moreover, in a case where a camera discussed in Japanese Patent Application Laid-Open No. 2016-122030 is used to automatically adjust the size of a subject image with automatic zoom control while being put at a place, a zoom operation may enlarge the image capturing range near the center of an image plane. Therefore, the user is required to adjust the orientation of the camera in such a manner that a subject image falls within the range near the center.

On the other hand, if only the automatic cropping function is used to adjust an image capturing range, in a case where the range occupied by a subject in an image is small, the resolution of an image obtained by clipping and enlargement decreases, so that a decrease in image quality may become large.

Further features of the disclosure will become apparent from the following description of exemplary embodiments with reference to the attached drawings.

BRIEF DESCRIPTION OF THE DRAWINGS

FIG. 2 is a diagram illustrating, as an example, a relationship between the focal length and the focus lens position for each subject distance.

FIG. 7 is a flowchart illustrating the entirety of processing for acquiring a reference size.

DESCRIPTION OF THE EMBODIMENTS

Various exemplary embodiments, features, and aspects of the disclosure will be described in detail below with reference to the drawings.

An imaging apparatus according to an exemplary embodiment of the disclosure is able to automatically adjust an image capturing range in such a manner that, in self-timer image capturing, a subject image falls within a predetermined range, while reducing a decrease in image quality which would be caused by cropping.

The imaging apparatus according to the present exemplary embodiment performs adjustment of an image capturing range using an automatic zoom control function and an automatic cropping function in combination.

Figure 1:
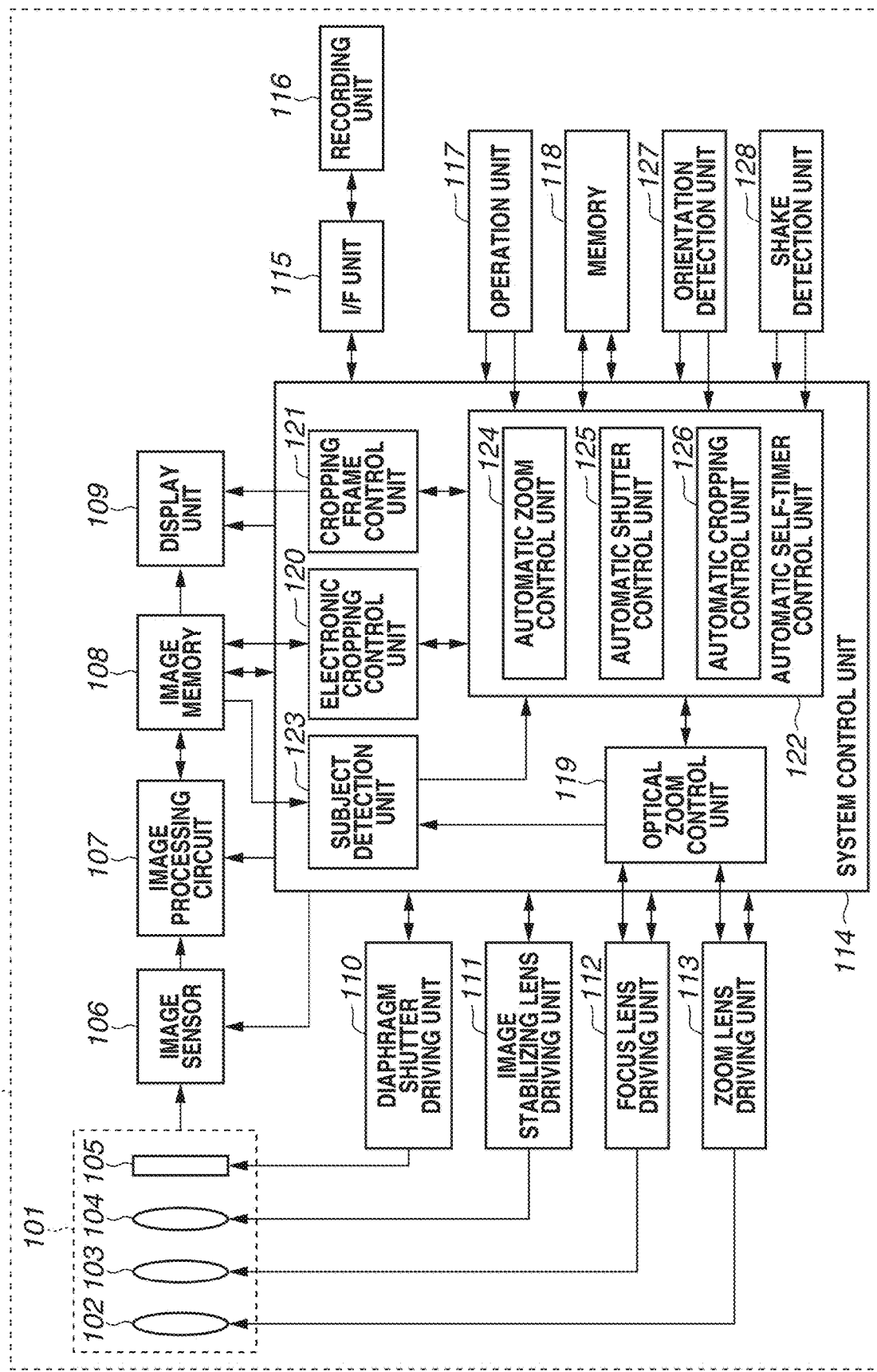
FIG. 1 is a block diagram illustrating a configuration example of a digital camera according to an exemplary embodiment of the present disclosure.

FIG. 1 is a block diagram illustrating a configuration example of a lens-integrated digital camera 100 having an automatic self-timer function, which serves as an example of the imaging apparatus according to the present exemplary embodiment.

A lens barrel 101 contains a group of lenses therein. A zoom lens 102 is movable along the optical axis direction of the lens barrel 101 to adjust the focal length, thus optically changing an angle of view (moving the zoom position). A focus lens 103 is movable along the optical axis direction of the lens barrel 101 to perform focus adjustment. An image stabilizing lens (image shake correction lens) 104 is movable in a plane perpendicular to the optical axis to move the optical axis, thus correcting an image shake caused by, for example, camera shake. A diaphragm shutter 105, which performs light amount adjustment, is configured to be able to adjust the amount of light, thus being used for exposure control. Furthermore, while, in the present exemplary embodiment, the digital camera 100 is an imaging apparatus in which the lens barrel 101 and a camera body portion are configured integrally with each other, the present exemplary embodiment is not limited to this. The present exemplary embodiment can also be applied to an imaging system configured with a camera body portion and an interchangeable lens which is detachably attached to the camera body portion.

An image sensor 106 is an imaging unit which generates a captured image signal by receiving light having passed through the lens barrel 101 and converting a subject image into an electrical signal by photoelectric conversion. The image sensor 106 to be used includes, for example, a charge-coupled device (CCD) type or a complementary metal-oxide semiconductor (CMOS) type image sensor. A captured image signal generated by and output from the image sensor 106 is input to an image processing circuit 107. The image processing circuit 107 performs various processing operations, such as pixel interpolation processing and color conversion processing, on the input captured image signal. Image data subjected to the various processing operations is output to an image memory 108 and is then stored therein. The image memory 108 is a storage device, such as a dynamic random access memory (DRAM) or static random access memory (SRAM).

A display unit 109 is configured to include, for example, a thin-film transistor (TFT)-type liquid crystal display (LCD), and displays a captured image (image data) and specific information (for example, image capturing information). Displaying information, such as a live view, concerning a captured image implements an electronic viewfinder (EVF) function which is usable for the user to perform adjustment of an image capturing range (adjustment of the angle of view).

A diaphragm shutter driving unit 110 calculates an exposure control value (an aperture value and a shutter speed) based on luminance information obtained by image processing performed by the image processing circuit 107, and drives the diaphragm shutter 105 based on a result of calculation. With this, automatic exposure (AE) control is performed. An image stabilizing lens driving unit 111 calculates the amount of shake applied to the digital camera 100 based on shake detection information obtained by an angular velocity sensor such as a gyroscope sensor. The image stabilizing lens driving unit 111 drives the image stabilizing lens 104 in such a way as to reduce the amount of shake applied to the digital camera 100 based on a result of calculation.

A focus lens driving unit 112 drives the focus lens 103. In the present exemplary embodiment, the digital camera 100 performs automatic focusing (AF) control with the contrast method. More specifically, the focus lens driving unit 112 drives the focus lens 103 in such a way as to focus on a subject based on focus adjustment information (contrast evaluation value) about an image capturing optical system obtained by image processing performed by the image processing circuit 107. However, the present exemplary embodiment is not limited to this, but a phase-difference AF method can be employed as AF control other than the contrast method. Moreover, a configuration of performing AF control using a plurality of methods, such as a combination of the contrast method and another method, can be employed.

A zoom lens driving unit 113 drives the zoom lens 102 according to a zoom operation instruction. An operation unit 117 includes, for example, a zoom lever or a zoom button serving as a zoom operation member used for the user to issue an instruction for zooming to the digital camera 100. A system control unit 114 performs control to detect the amount of operation and the direction of operation of the zoom operation member used for a zoom instruction operation, calculate a zoom driving speed and a zoom driving direction, and move the zoom lens 102 along the optical axis according to a result of the calculation.

Image data generated by an image capturing operation is sent to a recording unit 116 via an interface unit (hereinafter referred to as an "I/F unit") 115 and is then recorded thereon. The image data is recorded on an external recording medium or a non-volatile memory 118 incorporated in the digital camera 100, or is recorded on both the external recording medium and the memory 118. The external recording medium to be used includes, for example, a memory card which is attachable to the digital camera 100 for use. Moreover, the non-volatile memory 118 is a storage medium incorporated in the digital camera 100. The memory 118 stores, in addition to program data and image data, setting information about the digital camera 100 and information about a parameter in an automatic zoom function, which is described below.

The operation unit 117 includes, in addition to the above-mentioned zoom operation member, for example, a release switch for issuing an instruction to start image capturing. A signal output from the operation unit 117 is sent to the system control unit 114, which is described below.

The system control unit 114 includes an arithmetic device such as a central processing unit (CPU). The system control unit 114 controls the entire digital camera 100 by sending control commands to various units in response to an operation performed by the user. The system control unit 114 executes various types of control programs stored in the memory 118, such as programs for performing, for example, control of the image sensor 106, AE/AF control, zoom control, and self-timer control. In response to the zoom operation member of the operation unit 117 being operated, a zoom operation is performed by an optical zoom control unit 119 and an electronic cropping control unit 120.

To maintain an in-focus state when the angle of view is changed by optical zoom, in a case where the lens barrel 101 is of the rear focus type, the focus lens 103 is to be moved to an appropriate focus position according to the position of the zoom lens 102. Such control is called computer zoom (CZ) control, which is performed by the optical zoom control unit 119 included in the system control unit 114. FIG. 2 is a diagram illustrating, as an example, a relationship between the focal length of a zoom lens and the focus lens position for each subject distance. In FIG. 2, the relationship between the focal length of a zoom lens and a focus position for attaining in-focus is illustrated in a graph as a data table related to each distance to a subject. In the present exemplary embodiment, this table is referred to a "focus cam table". In FIG. 2, the horizontal axis indicates the focal length corresponding to a zoom position, and the vertical axis indicates the focus position. The distance from the digital camera 100 to the subject (subject distance) is shown beside each graph line as an example.

When performing AF control, the system control unit 114 controls the focus lens driving unit 112 to move the focus lens 103 in a predetermined range, thus performing a scanning operation. The system control unit 114 detects a focus position serving as an in-focus point by a known method using, for example, a contrast evaluation value obtained during the scanning operation. The system control unit 114 calculates a subject distance by referring to the focus cam table using a zoom position and a focus position obtained at that time.

Next, control related to an automatic self-timer function in the system control unit 114 is described. In the present exemplary embodiment, the automatic self-timer function controls automatic zoom processing, automatic shutter processing, and automatic cropping processing to enable performing portrait image capturing without requiring the user to perform fine adjustment of an image capturing range.

As illustrated in FIG. 1, the system control unit 114 includes the optical zoom control unit 119, the electronic cropping control unit 120, a cropping frame control unit 121, an automatic self-timer control unit 122, and a subject detection unit 123. Moreover, the automatic self-timer control unit 122 includes an automatic zoom control unit 124, an automatic shutter control unit 125, and an automatic cropping control unit 126.

The digital camera 100 according to the present exemplary embodiment has an optical zoom function and an electronic zoom function, and the optical zoom control unit 119 and the zoom lens driving unit 113 perform optical zoom. The optical zoom control unit 119 detects the zoom position of the zoom lens 102 at intervals of a predetermined control period during a zoom operation. Then, the optical zoom control unit 119 performs control to drive the focus lens 103 in such a way as to follow up a focus cam table at the subject distance measured by AF control performed according to the detected zoom position. This enables performing an optical zoom operation while maintaining an in-focus state.

On the other hand, the electronic cropping control unit 120 and the image memory 108 perform electronic zoom and electronic cropping. The electronic cropping control unit 120 clips a target area from image data transferred to the image memory 108, thus implementing an electronic zoom function and an electronic cropping function. The electronic cropping control unit 120 is able to implement smooth electronic zoom displaying by gradually enlarging a clipping range near the center area of an image with a frame rate period of an image to be captured in the image sensor 106 and displaying an image of the enlarged clipping range on the display unit 109. Moreover, the electronic cropping control unit 120 is able to implement the electronic cropping function by clipping an optional image region after image capturing and then recording, on the recording unit 116, image data obtained by enlarging the clipped image region to an original image size.

The cropping frame control unit 121 displays, on the display unit 109, a range which is automatically clipped by an automatic cropping function, which is described below.

The subject detection unit 123 acquires image data stored in the image memory 108, and detects a desired subject region from the acquired image data. In the present exemplary embodiment, a subject detection method of detecting a subject (the face of, for example, a person) based on face information included in image data (face detection processing) is described.

The face detection processing is processing for detecting a face region present in image data by a known algorithm. For example, the subject detection unit 123 extracts a feature amount from a square partial area on image data and compares the extracted feature amount with a previously-prepared face feature amount. Then, if a correlation value between the two feature amounts exceeds a predetermined threshold value, the subject detection unit 123 determines that the partial area is a face region. The subject detection unit 123 repeats this determination while changing a combination of the size, setting position, and setting angle of the partial area, thus being able to detect various face regions present in image data. As mentioned above, the automatic self-timer control unit 122 includes the automatic zoom control unit 124, which performs automatic zoom control, the automatic shutter control unit 125, which performs automatic shutter control, and the automatic cropping control unit 126, which performs automatic cropping control.

The automatic zoom control unit 124 automatically performs control of optical zoom based on information about the subject detected by the subject detection unit 123 and the set parameter. Examples of a combination of information about a subject and a parameter include a set of the size of a subject and a reference size and a set of the position of a subject and a reference position, but the two sets can be used together. Here, a case is described in which zoom control is performed based on the size of a subject. In a case where an image of the subject detected by the subject detection unit 123 has become larger than a predetermined size (a size indicating a parameter), the automatic zoom control unit 124 starts a zoom-out operation. In other words, the automatic zoom control unit 124 issues a zoom-out instruction to the optical zoom control unit 119. On the other hand, in a case where an image of the detected subject has become smaller than the predetermined size, the automatic zoom control unit 124 issues a zoom-in instruction to the optical zoom control unit 119. Such processing enables the user to adjust the size of a subject image without performing a zoom operation. While details of the method of setting a parameter are described below, the parameter is set based on the size of a range which is clipped by automatic cropping processing performed by the automatic cropping control unit 126 (hereinafter referred to as a "cropping range"). This enables controlling the magnification of optical zoom to such an extent as to be able to change a composition without allowing the resolution of an image for recording to decrease to a predetermined resolution or less.

When subject information detected by the subject detection unit 123 satisfies a predetermined condition, the automatic shutter control unit 125 instructs, for example, the diaphragm shutter driving unit 110 and the image sensor 106 to start image capturing processing. As conditions for starting image capturing processing, for example, "the set number of subjects being detected", "the number of subjects increasing", and "a subject being detected at a predetermined position" are determined. Moreover, a condition obtained by combining these conditions can be determined as a condition for starting image capturing processing. Furthermore, in a case where the subject detection unit 123 includes a detection function, such as the detection of the direction of a face, the detection of a smile face, or the detection of closing of eyes, the detection of a frontal face, the detection of a smile face, or the detection of closing of eyes can be determined as a condition for starting image capturing processing. Additionally, a configuration can be employed in which, in a case where a predetermined condition is not satisfied even if a predetermined time elapses, an instruction for starting image capturing processing is issued. Furthermore, the automatic shutter control unit 125 can be substituted with a self-timer control unit. When a predetermined time elapses from the set time, the self-timer control unit instructs, for example, the diaphragm shutter driving unit 110 and the image sensor 106 to start image capturing processing. Furthermore, the image capturing processing includes processing for exposure on the image sensor 106 and recording of an image signal obtained by exposure on the recording unit 116.

The automatic cropping control unit 126 performs clipping and enlargement processing on a captured image in such a manner that a subject falls within a predetermined range of a cropped image. A captured image signal obtained by exposure on the image sensor 106 after starting of image capturing is processed by the image processing circuit 107 and is then stored as image data in the image memory 108. The automatic cropping control unit 126 acquires a cropping range which encompasses a subject detected by the subject detection unit 123 with respect to the image data, and communicates the cropping range to the electronic cropping control unit 120. The electronic cropping control unit 120 performs enlargement processing in such a manner that the communicated cropping range is enlarged to an original image size and transfers the enlarged image to, for example, a memory card of the recording unit 116, thus implementing clipping and enlargement processing.

An orientation detection unit 127 detects the orientation (for example, the normal position, the grip facing up, or the grip facing down) of the digital camera 100 based on information acquired from an acceleration sensor. A shake detection unit 128 detects a shaking state of the digital camera 100 based on, for example, angular velocity information acquired from a gyroscope sensor. Moreover, when the amount of shake detected by, for example, a gyroscope sensor is equal to or greater than a threshold value, the shake detection unit 128 determines that the digital camera 100 is in a hand-held state, and, when the amount of shake is less than the threshold value, the shake detection unit 128 determines that the digital camera 100 is in a state of being fixed to, for example, a tripod. The acceleration sensor and the gyroscope sensor used for orientation detection and shake detection can be configured to be used also as a sensor of a detection unit for acquiring control information for the image stabilizing lens driving unit 111.

Next, processing for the automatic self-timer function in the present exemplary embodiment is described with reference to FIGS. 3A, 3B, and 3C to FIG. 11.

Figure 3B:
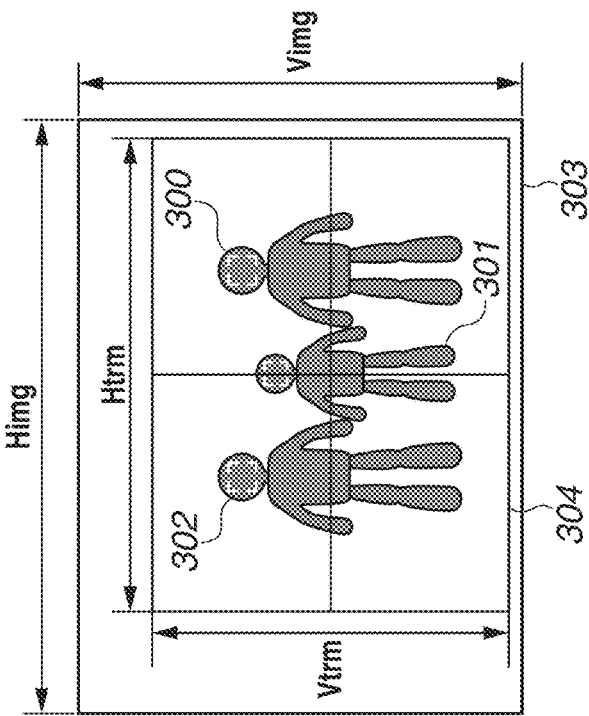
FIGS. 3A, 3B, and 3C are diagrams used to explain image capturing ranges which are adjusted by automatic zoom control and automatic cropping control.
Figure 3A:
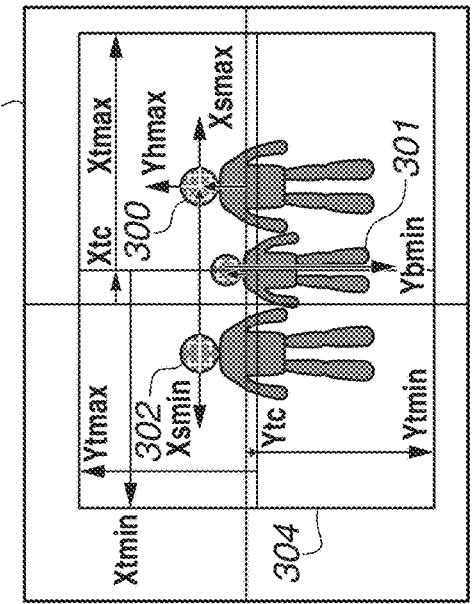
Figure 3C:
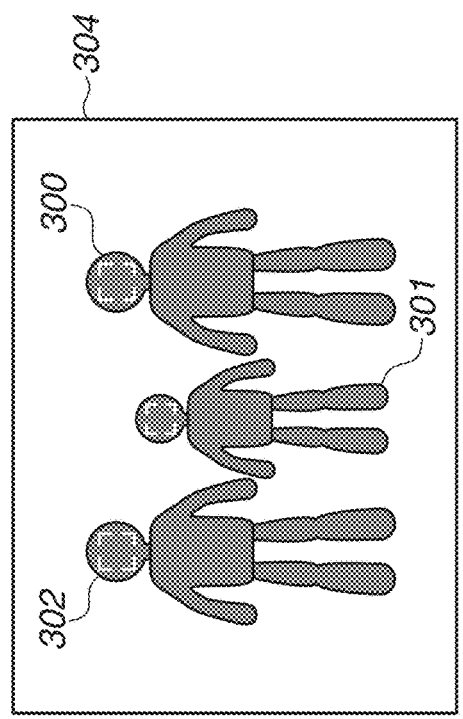

FIGS. 3A to 3C are diagrams used to explain an image capturing range which is adjusted by automatic zoom control and automatic cropping control with respect to a subject in the automatic self-timer function. The outline of the automatic self-timer function is described with reference to FIGS. 3A to 3C. FIGS. 3A to 3C illustrate relationships between subjects 300 301, and 302 targeted for image capturing, an image capturable range 303, which is displayed in the entire screen of the display unit 109, and a cropping range 304 for automatic cropping processing, which is controlled by the automatic cropping control unit 126. In the present exemplary embodiment, an image which is finally recorded on a recording medium is the cropping range 304 included in the image capturable range 303, so that the cropping range 304 serves as an image capturing range. Moreover, a face frame is displayed in the face region of each subject (person) detected by the subject detection unit 123. Unless expressly described otherwise, for descriptive purposes, the position of a face frame and the size of a face frame of a subject are referred to as the "detected position of a subject" and the "detected size of a subject".

FIG. 3A illustrates an example of an image capturing range just after the camera is placed in the case of taking a group photograph using the automatic self-timer function. If this image capturing range is maintained, a photograph with a composition in which subjects are too small and are located at positions deviating from the center of an image plane would be taken. In the present exemplary embodiment, even in a case where the camera is placed in such an orientation, image capturing can be performed with an appropriate composition by automatic zoom control and automatic cropping control. In automatic zoom control using optical zoom (automatic optical zoom control), a subject image can be enlarged without a decrease in image quality being caused. However, enlargement by optical zoom is only enlargement around the center of an image plane serving as the optical axis. On the other hand, in automatic cropping control using electronic cropping, an optional position in an image plane can be enlarged, but, if the enlargement magnification increases, a decrease in image quality would be caused. Therefore, in the automatic self-timer function in the present exemplary embodiment, the electronic cropping magnification is set to a unique magnification according to which a decrease in image quality is a predetermined level or less, the size of a subject is adjusted by optical zoom, and the position of a subject is adjusted by electronic cropping.

FIG. 3B illustrates a composition obtained from the image capturing range illustrated in FIG. 3A by causing the automatic zoom control unit 124 to control the optical zoom control unit 119 to enlarge subject images by optical zoom. In automatic zoom control, the automatic zoom control unit 124 acquires a parameter for a subject which is set in such a manner that a range obtained by adding a predetermined margin amount to the position of a subject located at the most periphery from the center of an image plane serves as a cropping range, and performs a zoom-in operation by optical zoom until the size of a subject becomes equal to the size corresponding to a parameter.

FIG. 3C illustrates a composition obtained by causing the automatic cropping control unit 126 to control the electronic cropping control unit 120 to perform clipping and enlargement in such a manner that the subjects fall within the vicinity of the center of an image plane (i.e., a composition in the cropping range 304). After zoom-in is performed by automatic zoom control up to the angle of view illustrated in FIG. 3B, the automatic shutter control unit 125 determines timing for performing image capturing. When subject information detected by the subject detection unit 123 satisfies a predetermined condition, the automatic shutter control unit 125 starts image capturing of a still image, and the electronic cropping control unit 120 clips and enlarges a range displayed with the cropping range 304 and then records the clipped and enlarged range. As described above, performing control using automatic zoom control and automatic cropping control enables automatically adjusting an image capturing range in such a manner that a subject falls within a predetermined range while preventing or reducing a decrease in image quality. Moreover, automatic shutter control enables performing image capturing at appropriate timing.

Figure 4:
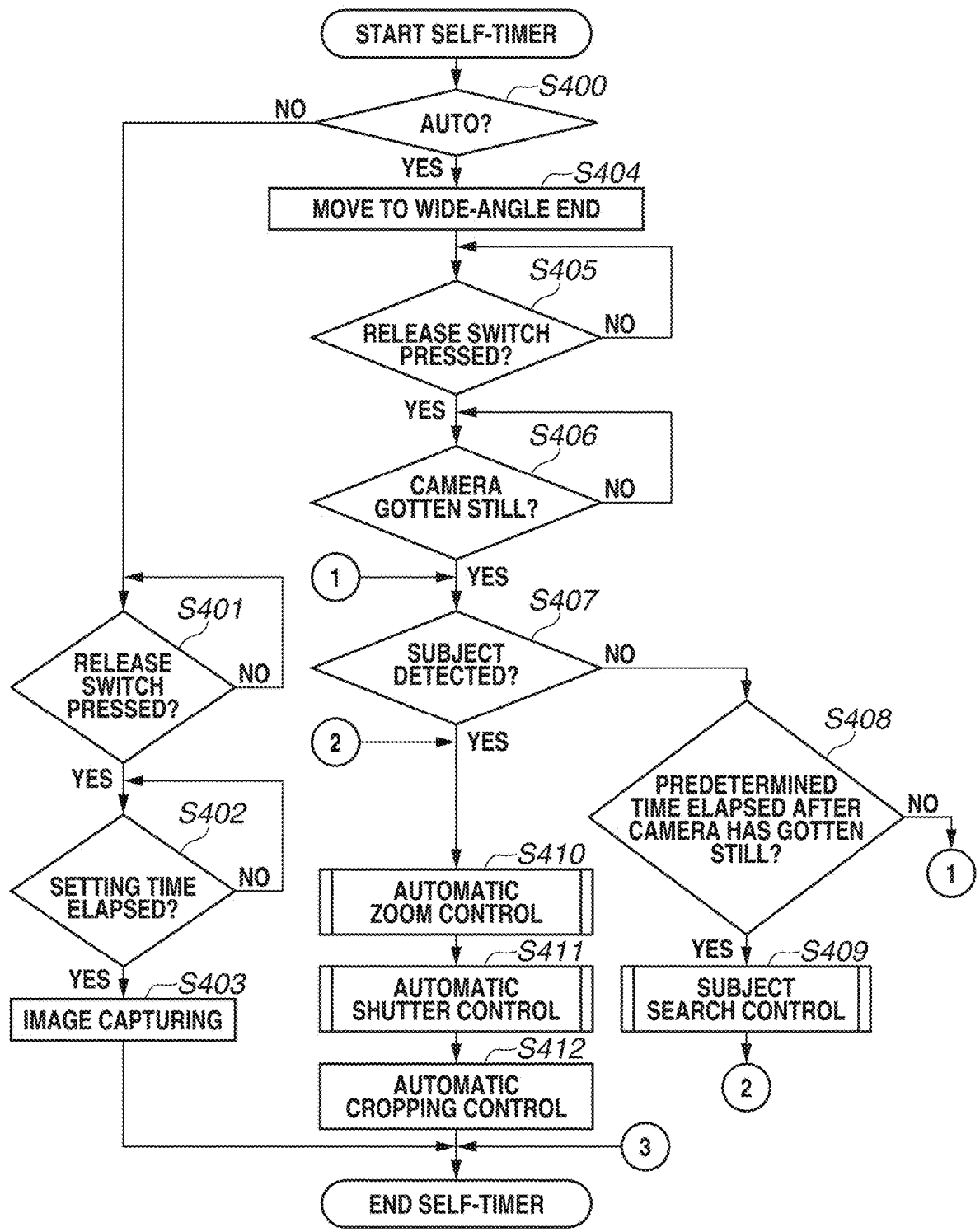
FIG. 4 is a flowchart illustrating an overall processing example of a self-timer function.

Next, the flow of processing for the self-timer function is described with reference to FIG. 4. FIG. 4 is a flowchart illustrating an overall processing example of the self-timer function. Unless expressly described otherwise, the following self-timer function is assumed to be performed based on a command issued by the system control unit 114 (automatic self-timer control unit 122).

First, in step S400, the system control unit 114 determines whether setting is automatic self-timer or normal self-timer. Setting of self-timer can be configured to enable selecting an auto function in addition to setting times of normal self-timer, such as "3 seconds", "10 seconds", and "auto". If it is determined that setting is a setting time of normal self-timer (NO in step S400), the processing proceeds to step S401 for performing self-timer processing based on measurement of the setting time. In normal self-timer processing, in step S401, the system control unit 114 determines whether a release switch of the operation unit 117 has been pressed. If, in step S401, it is determined that the release switch has been pressed (YES in step S401), the processing proceeds to step S402 for waiting for a self-timer setting time to elapse. If, in step S402, it is determined that the setting time has elapsed (YES in step S402), the processing proceeds to step S403. In step S403, the system control unit 114 performs image capturing processing, and, then, the self-timer function ends.

If, in step S400, it is determined that setting is automatic self-timer (YES in step S400), the processing proceeds to step S404. In step S404, the automatic zoom control unit 124 instructs the optical zoom control unit 119 and the electronic cropping control unit 120 to move optical zoom and electronic zoom to the wide-angle end. The angle of field is widened to the wide-angle end, so that control is performed in such a way as to cause all of the subjects targeted for image capturing to fall within an image plane.

Upon completion of the zoom operation to the wide-angle end, the processing proceeds to step S405. In step S405, the system control unit 114 determines whether the release switch of the operation unit 117 has been pressed. If, in step S405, it is determined that the release switch has been pressed (YES in step S405), the processing proceeds to step S406. In step S406, the system control unit 114 determines whether the camera has gotten still, in other words, whether the camera has been placed for self-timer image capturing, via the gyroscope sensor of the shake detection unit 128. If it is determined that the camera has not gotten still (NO in step S406), the processing waits in this step. Before subject detection is performed, it is determined whether the camera has been placed, so that such a phenomenon can be prevented that a subject being detected before completion of placement of the camera causes automatic zoom to operate in an erroneous manner.

If, in step S406, it is determined that the camera has gotten still (YES in step S406), the processing proceeds to step S407. In step S407, the system control unit 114 determines whether a subject has been detected by the subject detection unit 123. Additionally, the system control unit 114 stores a time at which the processing has proceeded to step S407. If it is determined that a subject has not been detected (NO in step S407), the processing proceeds to step S408. In step S408, the system control unit 114 determines an elapsed time from the time at which the processing has proceeded from step S406 to step S407. If a subject is not detected even when a predetermined time has elapsed from the time when the camera has gotten still (NO in step S408), a subject in the image plane may be too small and, therefore, may be unable to be detected by the subject detection unit 123. Accordingly, the processing proceeds to step S409, in which the system control unit 114 performs processing for searching for a subject by performing a zoom-in operation to a predetermined zoom position.

Figure 5:
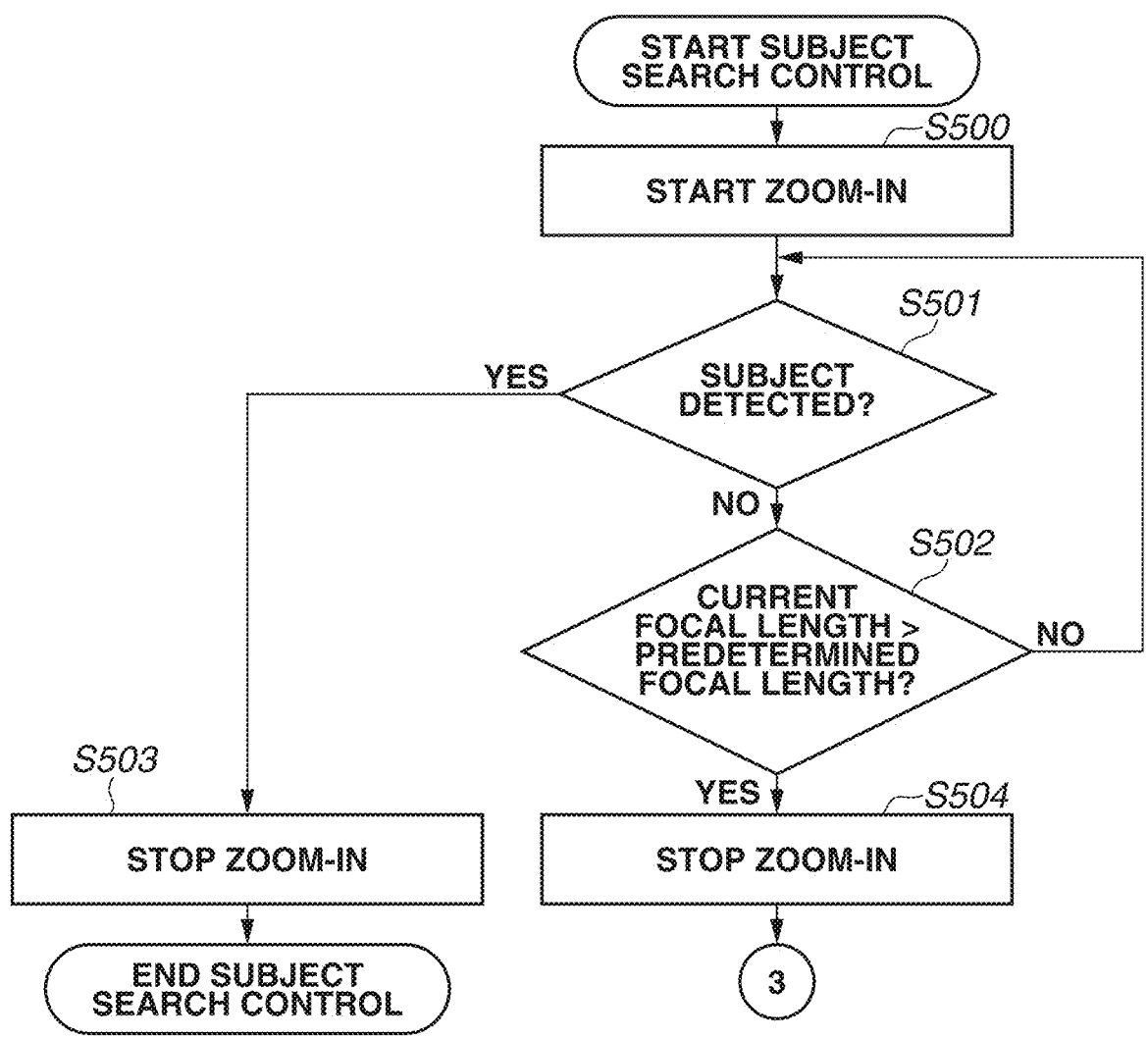
FIG. 5 is a flowchart illustrating processing for subject search control.

FIG. 5 is a flowchart illustrating the subject search processing in step S409. In step S500, the automatic zoom control unit 124 instructs the optical zoom control unit 119 to start a zoom-in operation from the position of the wide-angle end resulting from movement in step S404 to a predetermined focal length. Even during the zoom-in operation, in step S501, the system control unit 114 determines whether a subject has been detected by the subject detection unit 123. If it is determined that no subject has been detected (NO in step S501), the processing proceeds to step S502. If, in step S502, it is determined that the current focal length has not yet reached the predetermined focal length (NO in step S502), the processing returns to step S501. In other words, in parallel with the zoom-in operation, the system control unit 114 repeats determinations in step S501 and step S502 until a subject has been detected or the current focal length has reached the predetermined focal length. If, in step S501, it is determined that a subject has been detected by the subject detection unit 123 during the zoom-in operation (YES in step S501), the processing proceeds to step S503. In step S503, the system control unit 114 stops the zoom-in operation, and then ends the subject search processing. Then, the processing then proceeds to step S410, in which the system control unit 114 performs automatic zoom processing. If, in steps S501 and S502, no subject has been detected by the subject detection unit 123 even when the current focal length has reached the predetermined focal length (NO in step S501 and YES in step S502), the processing proceeds to step S504. In step S504, the system control unit 114 stops the zoom-in operation, and then ends the self-timer processing. At this time, the system control unit 114 can display a warning on the display unit 109 or issue a warning sound. Moreover, instead of ending the self-timer processing, the system control unit 114 can advance the processing to step S402 for performing normal self-timer processing (not including adjustment of an image capturing range by the imaging apparatus). In this way, according to the subject search processing being performed, even when the area of a subject in an image capturable range is too small for the subject detection processing, the possibility of the subject detection processing becoming able to be performed increases.

Figure 6A:
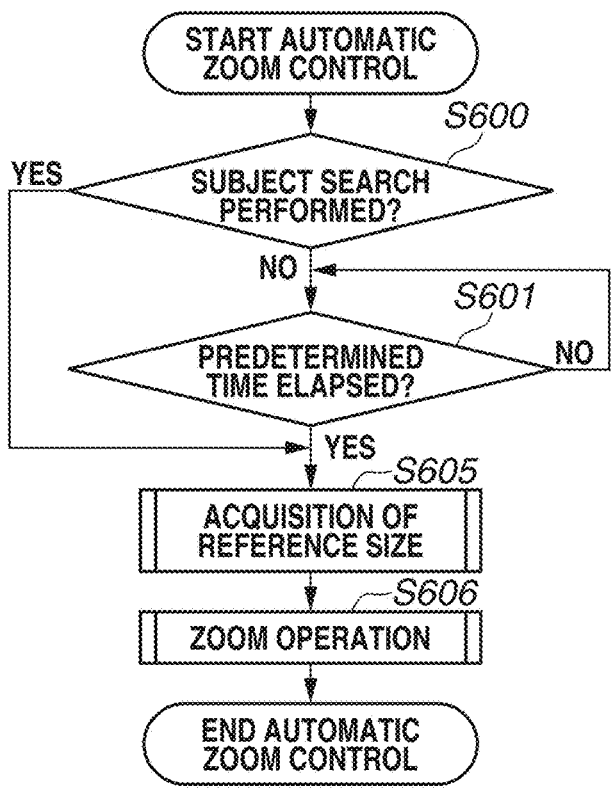
FIGS. 6A, 6B, and 6C are flowcharts illustrating processing for automatic zoom control.
Figure 6B:
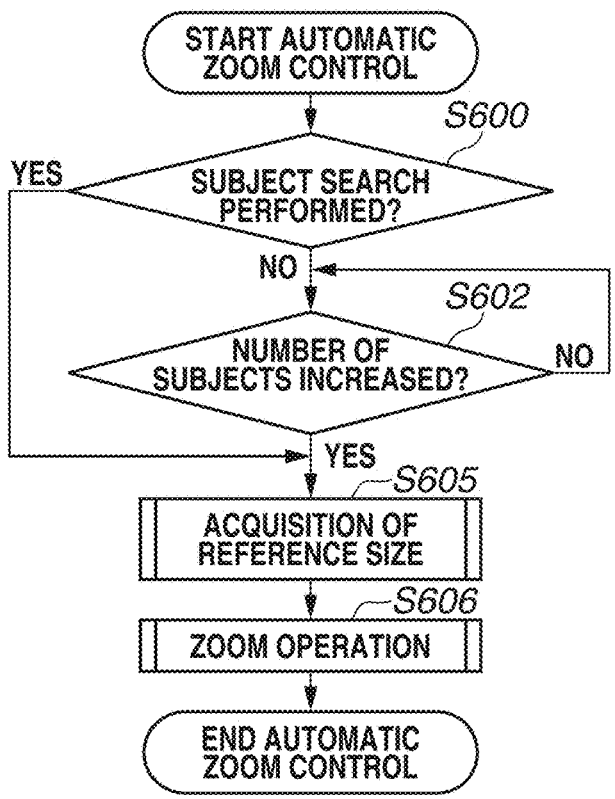
Figure 6C:
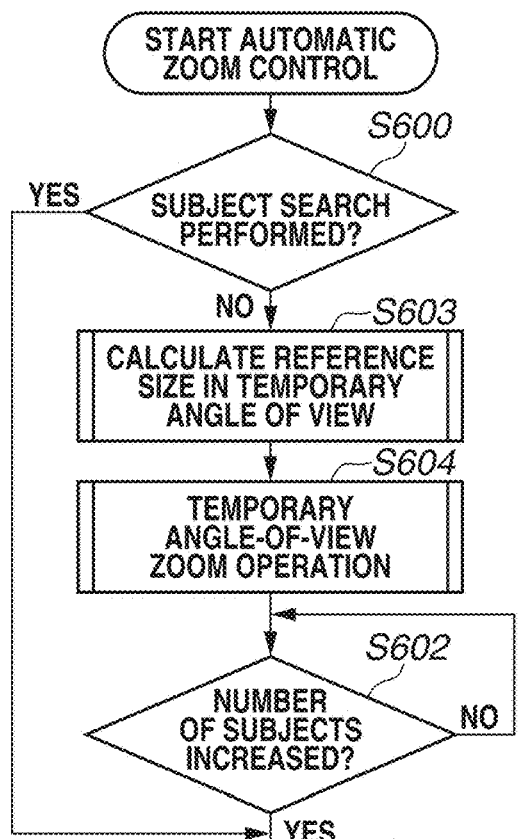

If, in step S407 or step S501, it is determined that a subject has been detected (YES in step S407 or YES in step S501), the processing proceeds to step S410. In step S410, the system control unit 114 performs automatic zoom processing. Here, the flow of the automatic zoom processing in step S410 is described with reference to FIGS. 6A, 6B, and 6C. FIGS. 6A to 6C illustrate different exemplary embodiments for preventing automatic zoom from operating in an erroneous manner during a period from the time when the user presses the release switch to the time when the user moves to such a position that an image of the user appears in the image plane. Furthermore, in FIGS. 6A to 6C, processing operations in common are assigned the respective same reference characters for description.

FIG. 6A illustrates an example of processing for setting a time corresponding to the time required for the user to move to such a position that an image of the user appears in the image plane as a timer and then proceeding to automatic zoom processing after waiting for the set time to elapse. First, in step S600, the system control unit 114 determines whether the subject search processing in step S409 has been performed. If it is determined that the subject search processing has been performed (YES in step S600), it is highly possible that the user has already moved to such a position that an image of the user appears in the image plane. Accordingly, if the subject search processing has already been performed, the system control unit 114 does not perform waiting for the user to move. If it is determined that the subject search processing has not been performed (NO in step S600), the processing proceeds to step S601. In step S601, the system control unit 114 determines whether a predetermined time has elapsed from the time when a subject has been detected in step S407. If it is determined that the predetermined time has elapsed (YES in step S601), the processing proceeds to step S605. Furthermore, the system control unit 114 can measure a time from the time when it is determined in step S406 that the camera has gotten still.

FIG. 6B illustrates an example of processing for counting the number of subjects detected by the subject detection unit 123, determining that the user has moved to such a position that an image of the user appears in the image plane in response to the number of subjects having increased, and then proceeding to automatic zoom processing. if, in step S600, it is determined that the subject search processing has already been performed (YES in step S600), as in the exemplary embodiment illustrated in FIG. 6A, the system control unit 114 does not perform waiting for the user to move. If it is determined that the subject search processing has not been performed (NO in step S600), the processing proceeds to step S602. In step S602, the system control unit 114 counts the number of subjects and then determines whether the number of currently detected subjects has increased from the stored number of subjects detected in step S407 in advance. If it is determined that the number of currently detected subjects has increased (YES in step S602), the system control unit 114 determines that the user has moved to such a position that an image of the user appears in the image plane and then advances the processing to step S605. In step S602, if it is determined that the number of currently detected subjects has not increased (NO in step S602), the system control unit 114 repeats the processing in step S602. In other words, in step S602, the system control unit 114 periodically repeats the detection of subjects and the counting of the number of subjects. If it is determined that the current number of subjects has increased, compared with the number of subjects previously counted, the processing proceeds to the next step S605.

FIG. 6C illustrates an example of processing for, after temporarily performing a zoom-in operation to such a somewhat wide angle of view (temporary angle of view) as to be able to detect the user coming in later, in response to determining that the user has moved to such a position that an image of the user appears in the image plane, re-performing a zoom-in operation to a normal image capturing angle of view. If, in step S600, it is determined that the subject search processing has been performed (YES in step S600), since it is highly possible that the user has already moved to a position corresponding to an image capturable range, the system control unit 114 omits a zoom-in operation directed to the temporary angle of view and advances the processing to step S605 for performing ordinary automatic zoom processing. On the other hand, if it is determined that the subject search processing has not been performed (NO in step S600), the processing proceeds to step S603. In step S603, the system control unit 114 acquires a reference size in the temporary angle of view (hereinafter referred to as a "temporary reference size") with respect to a subject detected in step S407 just after the user has placed the camera. The method of acquiring the temporary reference size is the same as the method of acquiring the reference size except that the user is not included as a subject targeted for image capturing. A specific method of acquiring the reference size is described below. After acquiring the temporary reference size in step S603, then in step S604, the system control unit 114 performs a zoom operation in automatic zoom control with respect to the temporary reference size. After completing an automatic zoom operation that is based on the temporary reference size (hereinafter referred to as a "temporary angle-of-view zoom operation"), the system control unit 114 advances the processing to step S602. In step S602, as in the example illustrated in FIG. 6B, the system control unit 114 determines whether the number of currently detected subjects has increased from the number of subjects detected in step S407. If it is determined that the number of currently detected subjects has increased (YES in step S602), the system control unit 114 determines that the user has moved to such a position that an image of the user appears in the image plane and then advances the processing to step S605. Furthermore, even in the flow illustrated in FIG. 6C, the system control unit 114 can re-perform zoom-in after a time corresponding to the time required for the user to move elapses. In that case, the system control unit 114 can perform step S601 illustrated in FIG. 6A instead of step S602.

In the exemplary embodiment illustrated in FIG. 6A, waiting starting of automatic zoom control for a predetermined time enables preventing an erroneous operation of automatic zoom with a simple condition. In the exemplary embodiment illustrated in FIG. 6B, counting an increase in the number of subjects enables more reliably determining that the user has moved to a position corresponding to an image capturable range. Moreover, in the exemplary embodiment illustrated in FIG. 6C, performing automatic zoom until a temporary angle of view is reached while the user is moving to a position corresponding to an image capturable range enables shortening a waiting time required for automatic zoom processing after the user has moved to a position corresponding to an image capturable range. Furthermore, as determination conditions, the measurement of time and the determination of an increase in the number of subjects can be combined. In this way, after predetermined conditions (execution of subject search processing, elapse of a predetermined time, increase in the number of subjects, and the like) are satisfied after an image capturing instruction has been given by the user, the processing proceeds to the next step S605. A reference size is acquired based on the image to be acquired after the predetermined conditions are satisfied, whereby an erroneous operation is reduced.

Figure 8:
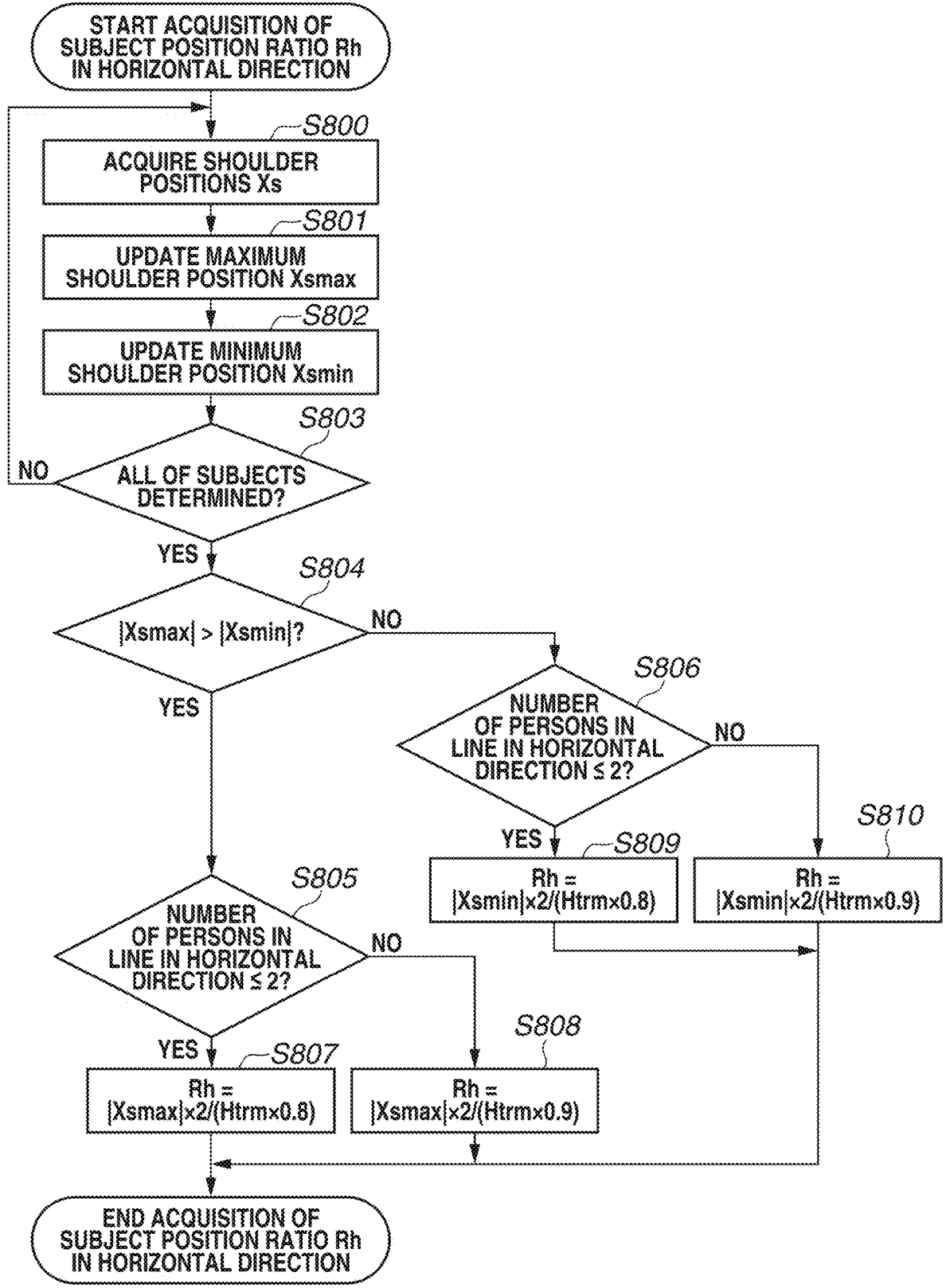
FIG. 8 is a flowchart illustrating processing for acquiring a horizontal direction subject position ratio.

Next, the processing for acquiring the reference size performed in step S603 and step S605 is described with reference to FIG. 7 to FIG. 9. FIG. 7 is a flowchart illustrating the entirety of processing for acquiring the reference size.

First, in step S700 illustrated in FIG. 7, the system control unit 114 performs processing for acquiring a subject position ratio Rh in the horizontal direction. The subject position ratio Rh in the horizontal direction is the ratio of "the distance from the center of an image plane to the horizontal position of a subject closest to the periphery of the image plane×2" to a predetermined proportion in the size of a cropping range in the horizontal direction (a horizontal cropping size Htrm). The predetermined proportion is a value which can be determined as appropriate according to in what degree of range to locate subjects in a cropped range, i.e., a finally recorded range, and is changed according to the number of persons in line in the horizontal direction determined in step S805, which is described below. For example, assuming that the predetermined proportion is 90%, automatic zoom processing and automatic cropping processing are performed in such a manner that the detected subject region is encompassed by a region of 90% in a central portion of the cropped region.

In subjects 300, 301, and 302 illustrated in FIG. 3A, the subject closest to the periphery of the image plane from the center thereof in the horizontal direction is the subject 300. The processing for acquiring the subject position ratio Rh in the horizontal direction is described with reference to the flowchart of FIG. 8.

In step S800, the system control unit 114 determines a subject region based on the center position or size of the face frame of a subject, and acquires coordinates (Xs) of the boundary between the subject region and a non-subject region. In the present specification, the position of this boundary is referred to as a "shoulder position". The center of the image capturable range 303 is assumed to be the origin (0, 0), the horizontal axis and the vertical axis in FIGS. 3A to 3C are assumed to be the x-axis and the y-axis, respectively, the right side and the upper side are assumed to be positive, the left side and the lower side are assumed to be negative, the center position of a face frame is assumed to be coordinates (Xc, Yc), and the size of a face frame in the horizontal direction is assumed to be Sh. Assuming that the number of face frames which occupy the distance from the center of the face frame to the shoulder position is Ns, the shoulder positions Xs of a subject can be acquired by the following formula.

$$Xs = Xc \pm Sh \times Ns$$

Here, "+ Sh" indicates the case of the observers' right end (in the case of the body of a subject facing the front, the left shoulder), and "− Sh" indicates the case of the observers' left end (the right shoulder).

Two shoulder positions Xs are acquired with respect to one subject.

Moreover, in the case of acquiring the temporary reference size in step S603, to ensure, as a margin, a region in which an image of the user comes at the time of acquisition of the shoulder positions Xs, the number Ns is set somewhat large, so that such a temporary reference size as to allow somewhat wide angle-of-view adjustment. Here, the acquisition of the shoulder positions Xs is not performed to acquire the actual shoulder positions of a subject, but is performed to determine a subject region to be processed in such a way as to be encompassed by a cropping region. Therefore, in a case where a subject is not intended to be located at a region close to the edge of the cropping region, for example, a somewhat large value is set to the number Ns, so that adjustment can be performed as appropriate irrespective of the physical size of a subject. Here, as examples of setting of the number Ns, in the case of acquiring a reference size with respect to an ordinary image capturing angle of view in step S605, the number Ns is set to 2, and, in the case of acquiring a temporary reference size in step S603, the number Ns is set to 6. After acquiring the shoulder positions Xs of a subject, the system control unit 114 advances the processing to step S801.

In step S801, in a case where the maximum value Xsmax of shoulder positions is not previously stored in the memory 118, the system control unit 114 stores the position having a larger value of the shoulder positions Xs acquired in step S800 as a maximum shoulder position Xsmax. Moreover, in a case where the maximum shoulder position Xsmax is previously stored in the memory 118, the system control unit 114 compares the shoulder positions Xs acquired in step S800 with the maximum shoulder position Xsmax. If any of the shoulder positions Xs is larger than the maximum shoulder position Xsmax, the system control unit 114 updates the maximum shoulder position Xsmax stored in the memory 118 with the position having a larger value of the shoulder positions Xs. After processing for updating the maximum shoulder position Xsmax, the system control unit 114 advances the processing to step S802.

In step S802, in a case where the minimum value Xsmin of shoulder positions is not previously stored in the memory 118, the system control unit 114 stores the position having a smaller value of the shoulder positions Xs acquired in step S800 as a minimum shoulder position Xsmin. Moreover, in a case where the minimum shoulder position Xsmin is previously stored in the memory 118, the system control unit 114 compares the shoulder positions Xs acquired in step S800 with the minimum shoulder position Xsmin. If any of the shoulder positions Xs is smaller than the minimum shoulder position Xsmin, the system control unit 114 updates the minimum shoulder position Xsmin stored in the memory 118 with the position having a smaller value of the shoulder positions Xs. After processing for updating the minimum shoulder position Xsmin, the system control unit 114 advances the processing to step S803.

In step S803, the system control unit 114 determines whether processing for acquiring the shoulder positions Xs and updating the maximum shoulder position Xsmax and the minimum shoulder position Xsmin has been completed with respect all of the detected subjects. If it is determined that the acquisition of the shoulder positions Xs and the updating of the maximum shoulder position Xsmax and the minimum shoulder position Xsmin have not been completed (NO in step S803), the system control unit 114 returns the processing to step S800, in which the system control unit 114 similarly acquires the shoulder positions Xs with respect to another subject and updates the maximum shoulder position Xsmax and the minimum shoulder position Xsmin as appropriate. If the determination of the maximum shoulder position Xsmax and the minimum shoulder position Xsmin has been completed with respect to all of the subjects and the updating of the maximum shoulder position Xsmax and the minimum shoulder position Xsmin has been completed (YES in step S803), the processing proceeds to step S804.

In step S804, the system control unit 114 compares the absolute value of the maximum shoulder position Xsmax and the absolute value of the minimum shoulder position Xsmin and determines which is located closer to the periphery of the image capturable range (in other words, which is farther from the origin in the horizontal direction). If it is determined that the maximum shoulder position Xsmax is located closer to the periphery of the image capturable range (YES in step S804), the processing proceeds to step S805. Moreover, if it is determined that the minimum shoulder position Xsmin is located closer to the periphery of the image capturable range (NO in step S804), the processing proceeds to step S806.

In steps S805 and S806, the system control unit 114 determines whether the number of persons serving as subjects in line in the horizontal direction (hereinafter referred to as the "number of persons in line in the horizontal direction") is equal to or less than a threshold value. This is for the purpose of adjusting the size of a margin portion in a cropping region according to the number of persons serving as subjects in line. In the present exemplary embodiment, in a case where the number of subjects is large as in a group photograph, such a composition as to fill the image plane with the subjects is employed, and, in a case where the number of subjects is small, such a composition as to leave a margin at the periphery of the image plane is employed. Moreover, with regard to the method of counting the number of persons in line in the horizontal direction, in a case where face frames overlap in the vertical direction (the up-and-down direction in the image plane), overlapping subjects are collectively counted as one person. For example, in a case where four persons as subjects are detected in an image capturable range and the face frames of two persons of the detected persons overlap in the up-and-down direction (y-axis direction), the subjects are counted as three persons. In the present exemplary embodiment, the threshold value is assumed to be two persons. If it is determined that the number of persons in line in the horizontal direction is two or less (YES in step S805 or S806), the processing proceeds to step S807 or S809. If it is determined that the number of persons in line in the horizontal direction is three or more (NO in step S805 or S806), the processing proceeds to step S808 or S810.

In each of steps S807 to S810, the system control unit 114 acquires the subject position ratio Rh in the horizontal direction. The subject position ratio Rh in the horizontal direction in step S807 is acquired as the ratio of "the absolute value of the maximum shoulder position Xsmax×2" to 80% of the horizontal cropping size Htrm. The subject position ratio Rh in the horizontal direction in step S808 is acquired as the ratio of "the absolute value of the maximum shoulder position Xsmax×2" to 90% of the horizontal cropping size Htrm. The subject position ratio Rh in the horizontal direction in step S809 is acquired as the ratio of "the absolute value of the minimum shoulder position Xsmin×2" to 80% of the horizontal cropping size Htrm. The subject position ratio Rh in the horizontal direction in step S810 is acquired as the ratio of "the absolute value of the minimum shoulder position Xsmin×2" to 90% of the horizontal cropping size Htrm. In steps S808 and S810, the number of subjects is large as compared with the case of proceeding to step S807 or S809, it can be considered that a composition almost the entirety of which is occupied by the subjects is sought. Therefore, the predetermined proportion to be multiplied by the horizontal cropping size is set large in such a manner that the margin portion becomes small as compared with step S807 or S809, and the value of the subject position ratio Rh in the horizontal direction is set small even in the same maximum or minimum shoulder position. After each of steps S807 to S810, the processing for acquiring the subject position ratio Rh ends.

Next, in step S701 illustrated in FIG. 7, the system control unit 114 performs processing for acquiring a subject position ratio Rv in the vertical direction. The subject position ratio Rv in the horizontal vertical is the ratio of "the distance from the center of the image capturable range to the vertical position of a subject closest to the periphery of the image capturable range×2" to a predetermined proportion in the size of a cropping range in the vertical direction (a vertical cropping size Vtrm). The predetermined proportion is, for example, 90% of the image plane size in the vertical direction. Performing, with respect to the vertical direction, processing similar to that for acquiring the subject position ratio Rh in the horizontal direction enables acquiring the subject position ratio Rv in the vertical direction.

In subjects 300, 301, and 302 illustrated in FIG. 3A, the subject whose head is farthest from the center of the image capturable range in the vertical direction (the y-coordinate of the face frame being largest) is the subject 300, and the subject whose foot is farthest from the center of the image plane is the subject 301. The processing for acquiring the subject position ratio Rv in the vertical direction is described with reference to the flowchart of FIG. 9.

Figure 9:
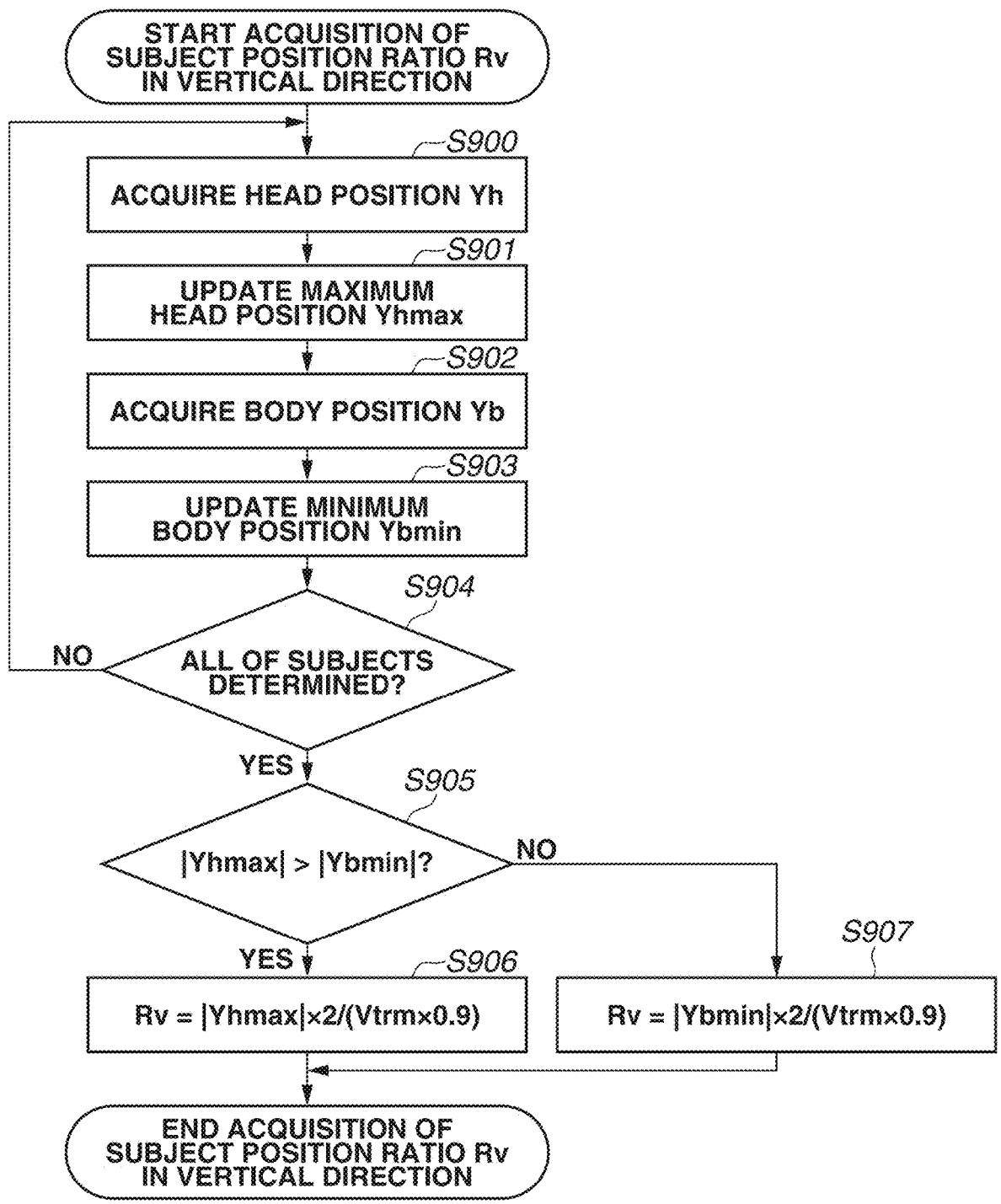
FIG. 9 is a flowchart illustrating processing for acquiring a vertical direction subject position ratio.

In step S900 illustrated in FIG. 9, the system control unit 114 determines the upper end of a subject region based on the center position or size of the face frame of a subject, and acquires coordinates (Yh) of the boundary between the upper end of the subject region and a non-subject region. In the present specification, the position of this boundary is referred to as a "head position". Assuming that the size of a face frame in the vertical direction is assumed to be Sv and the number of face frames which occupy the distance from the center of the face frame to the head position is Nh, the head position Yh of a subject can be acquired by the following formula.

$$Yh = Yc + Sv \times Nh$$

Here, the acquisition of the head position Yh is not performed to acquire the actual head position of a subject, but is performed to determine a subject region to be processed in such a way as to be encompassed by an image capturable range. Therefore, in a case where a subject is not intended to be located at a region close to the edge of the image capturable range (in a case where the margin is intended to be set large), for example, a somewhat large value is set to the number Nh, so that adjustment can be performed as appropriate. Here, the number Nh is set to 1.5. After acquiring the head position Yh of a subject, the system control unit 114 advances the processing to step S901.

In step S901, in a case where the maximum value Yhmax of head positions is not previously stored in the memory 118, the system control unit 114 stores the head position Yh acquired in step S900 as a maximum head position Yhmax. Moreover, in a case where the maximum head position Yhmax is previously stored in the memory 118, the system control unit 114 compares the head position Yh acquired in step S900 with the maximum head position Yhmax. If the head position Yh is larger than the maximum head position Yhmax, the system control unit 114 updates the maximum head position Yhmax stored in the memory 118 with the head position Yh. After processing for updating, the system control unit 114 advances the processing to step S902.

Next, in step S902, the system control unit 114 determines the lower end of the subject region based on the center position or size of the face frame of a subject, and acquires coordinates (Yb) of the boundary between the lower end of the subject region and a non-subject region. In the present specification, the position of this boundary is referred to as a "body position". Assuming that the number of face frames which occupy the distance from the center position of a face frame to the body position is Nb, the body position Yb of a subject can be acquired by the following formula.

$$Yb = Yc - Sv \times Nb$$

Setting the number Nb enables changing up to which position of the body to set as a subject region. As an example of setting in the present exemplary embodiment, the number Nb is set to 8, so that a composition in which up to the position of the foots of a subject is included is employed. After acquiring the body position Yb of a subject, the system control unit 114 advances the processing to step S903.

In step S903, in a case where the minimum value Ybmin of the body position is not previously stored in the memory 118, the system control unit 114 stores the body position Yb acquired in step S902 as a minimum body position Ybmin. Moreover, in a case where the minimum body position Ybmin is previously stored in the memory 118, the system control unit 114 compares the body position Yb acquired in step S902 with the minimum body position Ybmin. If the body position Yb is smaller than the minimum body position Ybmin, the system control unit 114 updates the minimum body position Ybmin stored in the memory 118 with the body position Yb. After processing for updating, the system control unit 114 advances the processing to step S904.

In step S904, the system control unit 114 determines whether processing for acquiring the head position Yh and the body position Yb with respect all of the detected subjects and updating the maximum head position Yhmax and the minimum body position Ybmin has been completed. If it is determined that the updating of the maximum head position Yhmax and the minimum body position Ybmin has not been completed (NO in step S904), the system control unit 114 returns the processing to step S900, in which the system control unit 114 similarly acquires the head position Yh and the body position Yb with respect to another subject. If the determination of the maximum head position Yhmax and the minimum body position Ybmin has been completed with respect to all of the subjects and the updating of the maximum head position Yhmax and the minimum body position Ybmin has been completed (YES in step S904), the processing proceeds to step S905.

In step S905, the system control unit 114 compares the absolute value of the maximum head position Yhmax and the absolute value of the minimum body position Ybmin and determines which is located closer to the periphery of the image capturable range (in other words, which is farther from the origin in the vertical direction). If it is determined that the maximum head position Yhmax is located closer to the periphery of the image capturable range (YES in step S905), the processing proceeds to step S906. Moreover, if it is determined that the minimum body position Ybmin is located closer to the periphery of the image capturable range (NO in step S905), the processing proceeds to step S907.

In each of steps S906 and S907, the system control unit 114 acquires the subject position ratio Rv in the vertical direction. The subject position ratio Rv in the vertical direction in step S906 is acquired as the ratio of "the absolute value of the maximum head position Yhmax×2" to 90% of the vertical cropping size Vtrm. Moreover, the subject position ratio Rv in the vertical direction in step S907 is acquired as the ratio of "the absolute value of the minimum body position Ybmin×2" to 90% of the vertical cropping size Vtrm. After step S906 or S907, the processing for acquiring the subject position ratio Rv in the vertical direction ends.

Next, in step S702 illustrated in FIG. 7, the system control unit 114 compares the subject position ratio Rh in the horizontal direction and the subject position ratio Rv in the vertical direction. This enables determining based on which of the horizontal direction and the vertical direction to perform automatic zoom processing. Thus, this enables determining which of the subject position ratio Rh in the horizontal direction and the subject position ratio Rv in the vertical direction the ratio of a value obtained by doubling the distance from the center of an image capturable range to the farthest position of the subject region to a size obtained by multiplying a cropping size in each direction by a predetermined proportion is. If it is determined that the subject position ratio Rh in the horizontal direction is larger than the subject position ratio Rv in the vertical direction (YES in step S702), the processing proceeds to step S703, and, if it is determined that the subject position ratio Rh in the horizontal direction is equal to or smaller than the subject position ratio Rv in the vertical direction (NO in step S702), the processing proceeds to step S704.

In each of steps S703 and S704, the system control unit 114 performs processing for acquiring a reference size based on the detected size of a subject and the subject position ratio acquired based on the subject position closest to the periphery determined in step S702. The reference size is acquired by dividing the detected size by the larger one of the subject position ratios. More specifically, in step S703, a reference size according to which to perform a zoom operation in such a manner that the size of the detected subject becomes a value obtained by multiplying the size of the detected subject by "1/the subject position ratio Rh in the horizontal direction" is acquired. In step S704, a reference size according to which to perform a zoom operation in such a manner that the size of the detected subject becomes a value obtained by multiplying the size of the detected subject by "1/the subject position ratio Rv in the vertical direction" is acquired. In a case where a plurality of subjects is detected, the reference size is acquired based on the detected size of any one of the subjects, so that a zoom operation described below can be performed based on the acquired reference size and the detected size of the subject. For example, in a case where the reference size is acquired based on the detected size of the subject 300, a zoom operation is performed based on the detected size of the subject 300 and the acquired reference size.

After the processing for acquiring the reference size in step S605 illustrated in each of FIGS. 6A to 6C ends, the processing proceeds to step S606. In step S606, the system control unit 114 performs a zoom operation. Here, the zoom operation is described with reference to FIG. 10.

Figure 10:
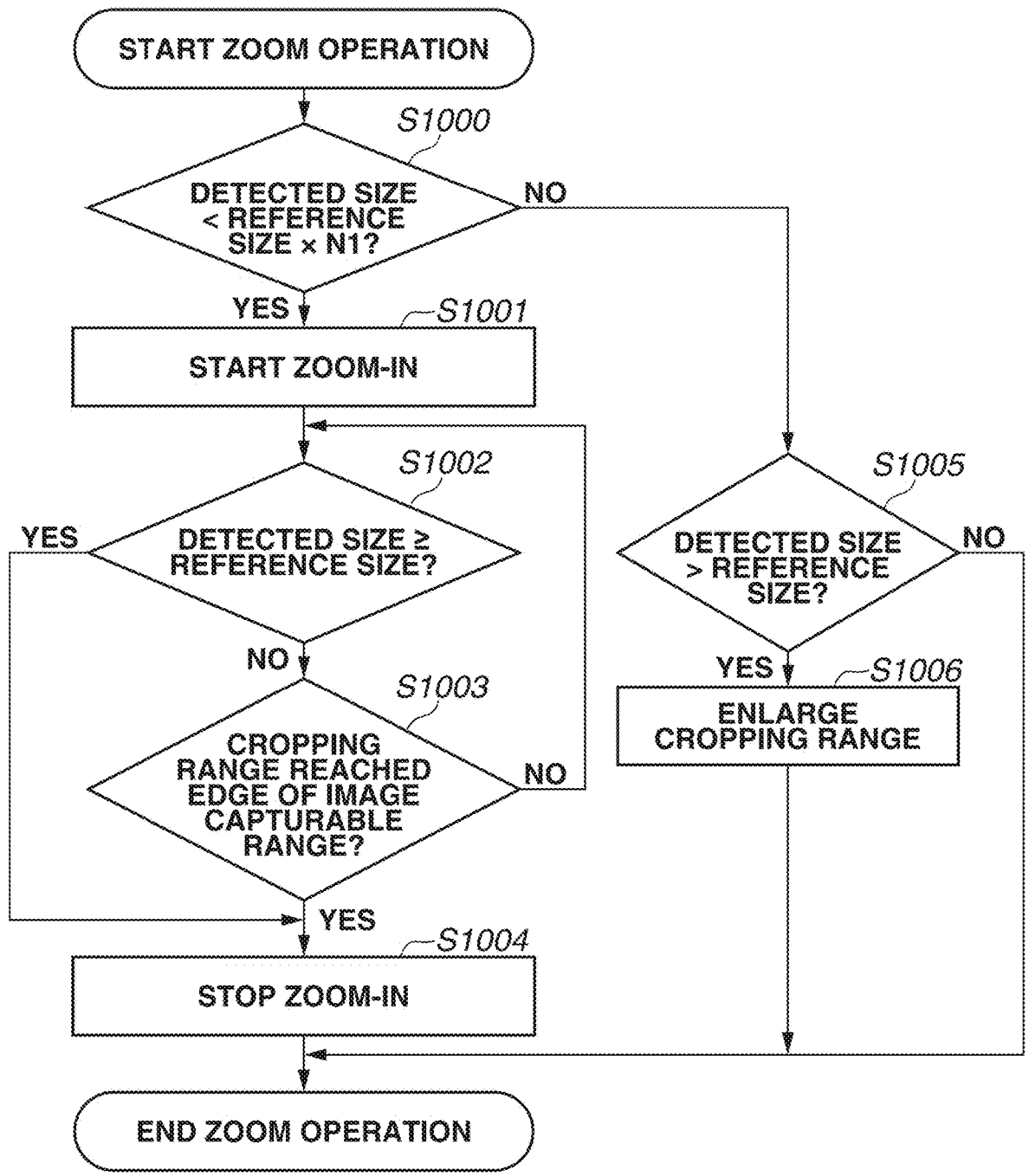
FIG. 10 is a flowchart illustrating a zoom operation.

In step S1000 illustrated in FIG. 10, the automatic zoom control unit 124 acquires a detected size from the subject detection unit 123, and compares the detected size with a size obtained by multiplying the reference size acquired in step S703 or step S704 by a predetermined proportion (assumed to be N1 and assumed to be N1<1). If the detected size of a subject is smaller than the predetermined proportion in the reference size (smaller than N1 times the reference size) (YES in step S1000), in other words, if the ratio of the area of the subject to the cropping range is less than a predetermined value, the processing proceeds to step S1001. In step S1001, the automatic zoom control unit 124 starts a zoom-in operation to perform optical zoom in the telephoto direction in such a way as to enlarge a subject image from the position of the wide-angle end resulting from movement in step S404. After starting the zoom-in operation, the automatic zoom control unit 124 advances the processing to step S1002 while continuing the zoom-in operation. In step S1002, the automatic zoom control unit 124 determines whether the size of the subject has been enlarged up to the reference size or more by the zoom-in operation. If it is determined that the reference size has been reached by the zoom-in operation (YES in step S1002), the processing proceeds to step S1004. In step S1004, the automatic zoom control unit 124 stops the zoom-in operation. If it is determined that the size of the subject has not been enlarged up to the reference size (NO in step S1002), the processing proceeds to step S1003. In step S1003, the automatic zoom control unit 124 determines whether the cropping range has reached the edge of the image capturable range.

Here, the processing for determining whether the cropping range has reached the edge of the image capturable range in step S1003 is described. First, the cropping range, which is set by the electronic cropping control unit 120, is described with reference to FIGS. 3A to 3C. In the present exemplary embodiment, the cropping range is set in such a manner that the shoulder position (maximum shoulder position Xsmax) of the left shoulder of the subject 300, which is a subject closest to the periphery in FIGS. 3A to 3C, the shoulder position (minimum shoulder position Xsmin) of the right shoulder of the subject 302, the head position (maximum head position Yhmax) of the subject 300, and the body position (minimum body position Ybmin) of the subject 301 fall within a predetermined proportion in the cropping range. In other words, with respect to the subjects, the position corresponding to "the maximum position+the minimum position" of the shoulder positions in the horizontal direction and the head position and body position in the vertical direction/2 is set as the center position of cropping. Accordingly, the center position of the cropping range can be obtained by the formula: (Xtc, Ytc)=((Xsmax+Xsmin)/2, (Yhmax+Ybmin)/2). Moreover, the enlargement magnification by cropping with respect to the entire image capturable range is assumed to be M (m≥1), the size (the unit thereof being assumed to be coordinates) of the image capturable range is assumed to be Himg (horizontal direction) and Vimg (vertical direction). In this case, the cropping size can be expressed as (Htrm, Vtrm)=(Himg/M, Vimg/M). In the present exemplary embodiment, such a size as not to cause a decrease in image quality is set as a cropping size. This size is a size allowing a resolution feeling to be maintained by performing resolution processing, such as pixel interpolation processing, on a cropped image using the image processing circuit 107. The size allowed to be set is determined by the number of pixels of the image sensor 106 and the recording size (also referred to as the number of recording pixels) used for recording on, for example, a memory card of the recording unit 116.

Next, the processing for determining the arrival of the cropping range at the edge of the image capturable range is described. The cropping range is a region encompassed by coordinate positions which are represented by the maximum values and minimum values in the horizontal direction and vertical direction (Xtmax, Xtmin, Ytmax, Ytmin) in the coordinate system with the center of the image capturable range set as the origin. The values of respective coordinate positions can be expressed, with use of the center position and size of cropping, by the formula: (Xtmax, Xtmin, Ytmax, Ytmin)=(Xtc+Htrm/2, Xtc−Htrm/2, Ytc+Vtrm/2, Ytc−Vtrm/2). In the present exemplary embodiment, the cropping position is successively updated even during the process of a zoom operation. As mentioned above, the cropping center position (Xtc, Ytc) is a variable which varies in proportion to the center position of a subject, and the cropping size (Htrm, Vtrm) is a constant which is determined by the enlargement magnification. Thus, when the center of a subject is located at a position away from the vicinity of the center of the image capturable range, the cropping range gradually moves toward the edge of the image capturable range according to the progress of zoom-in. When the result of acquisition of the maximum values and minimum values of the cropping range becomes such a value as to exceed the edge of the image capturable range, cropping becomes unable to be performed with a desired range, so that, when the cropping range reaches the edge of the image capturable range, the automatic zoom control unit 124 stops the zoom-in operation. More specifically, the automatic zoom control unit 124 determines whether the respective coordinates indicating the edge of the cropping range satisfy the conditional formulae: Xtmax>Himg/2, Xtmin<−Himg/2, Ytmax>Vimg/2, and Ytmin<−Vimg/2. If one or more conditional formulae of these four conditional formulae are satisfied, the automatic zoom control unit 124 stops the zoom-in operation. Furthermore, in the case of performing a zoom operation after determining the cropping position, the automatic zoom control unit 124 performs the processing for determining the arrival of the cropping range at the edge of the image capturable range before performing the zoom operation. Moreover, in the case of determining the cropping position after completing a zoom operation, the automatic zoom control unit 124 performs the processing for determining the arrival of the cropping range at the edge of the image capturable range after performing the zoom operation. However, since, in a case where the cropping range has exceeded the edge of the image capturable range, zoom-out is to be performed, in one embodiment, the automatic zoom control unit 124 determines the position of the cropping range during the process of a zoom operation and then perform the processing for determining the arrival.

In this way, in step S1003, the automatic zoom control unit 124 acquires the position of the cropping range and determines whether the above-mentioned conditional formulae are satisfied. If, in step S1003, it is determined that the above-mentioned conditional formulae are not satisfied (NO in step S1003), the automatic zoom control unit 124 determines that the cropping range has not reached the edge of the image capturable range and returns the processing to step S1002. Then, the automatic zoom control unit 124 continues the zoom-in operation while repeating the above determination until the condition used in step S1002 or S1003 is satisfied. If, in step S1003, it is determined that the above-mentioned conditional formulae are satisfied (YES in step S1003), the automatic zoom control unit 124 determines that the cropping range has reached the edge of the image capturable range and advances the processing to step S1004. In step S1004, the automatic zoom control unit 124 stops the zoom-in operation and also ends the zoom operation processing.

On the other hand, if, in step S1000, the detected size of a subject is equal to or larger than the size obtained by multiplying the reference subject size by N1 (NO in step S1000), the processing proceeds to step S1005. In step S1005, the automatic zoom control unit 124 determines whether the detected size of a subject is larger than the reference subject size. If the detected size of a subject is larger than the reference subject size, even when the optical zoom position is the wide-angle end, it is impossible to cause the two shoulder positions, the head position, and the body portion to concurrently fall within a region obtained by multiplying the cropping range by a predetermined proportion (0.8 or 0.9 in the present exemplary embodiment). In other words, the subject position ratio Rh or Rv in the horizontal direction or vertical direction becomes equal to or greater than 1. Therefore, if it is determined that the detected size of a subject is larger than the reference subject size (YES in step S1005), the automatic zoom control unit 124 advances the processing to step S1006 for changing the cropping range. In step S1006, the automatic zoom control unit 124 enlarges the cropping range by reducing the enlargement magnification M caused by the electronic cropping control unit 120, and thus sets such a cropping size as to allow the subject to fall within the cropping range. The setting value for the enlargement magnification M can be set based on the ratio of the detected size to the reference size, or electronic cropping can be canceled by setting M=1 in such a manner that the image capturable range is equal to the cropping range. Moreover, a configuration can be employed in which such a warning display or warning sound as to prompt the user to move away from the camera in such a manner that the entire subject falls within the cropping range is issued. After enlarging the cropping range in step S1006, the automatic zoom control unit 124 ends the zoom operation processing.

When the zoom operation processing performed in step S606 illustrated in each of FIGS. 6A to 6C is ended, the system control unit 114 ends the automatic zoom control in step S410 illustrated in FIG. 4, and advances the processing to step S411.

In step S411, the system control unit 114 causes the automatic shutter control unit 125 to perform determination for automatic shutter and then performs automatic image capturing at timing when an image capturing condition is satisfied. Next, automatic shutter control is described with reference to FIG. 11.

In step S1100, the automatic shutter control unit 125 determines whether the faces of all of the subjects detected by the subject detection unit 123 are facing front. If it is determined that all of the subjects are facing front (YES in step S1100), the processing proceeds to step S1101. Next, in step S1101, the automatic shutter control unit 125 determines the presence or absence of eye closure of the subjects detected by the subject detection unit 123. If, in step S1101, it is determined that the eyes of all of the subjects are open (YES in step S1101), the processing proceeds to step S1102. The above determinations in steps S1100 and S1101 are repeated until it is determined that all of the subjects are facing front and the eyes of all of the subjects are open. In step S1102, the system control unit 114 performs AE and AF in such a way as to optimize exposure and focus for the detected faces. After AE and AF are completed in step S1102, then in step S1103, the system control unit 114 starts image capturing processing and thus ends automatic shutter control. While, in the present exemplary embodiment, the direction of the face and the eye closure state are determined and are set as conditions for starting of image capturing, another condition can be employed. For example, a subject detection result such as smile detection can be used. Moreover, in a case where such a condition is not satisfied even if a predetermined time elapses, time-out processing which forcibly starts image capturing can be added.

After automatic shutter control is ended in step S411 illustrated in FIG. 4, the processing proceeds to step S412. In step S412, the automatic cropping control unit 126 performs automatic cropping control on an image to be captured. The automatic cropping control unit 126 issues an instruction for the above-mentioned cropping center position and cropping size to the electronic cropping control unit 120. Moreover, the automatic cropping control unit 126 performs clipping and enlargement processing on image data stored in the image memory 108 and transfers the processed image data to, for example, a memory card of the recording unit 116. With this, the processing for the automatic self-timer function, which is configured with automatic zoom control, automatic shutter control, and automatic cropping control, is ended.

Next, an image capturing sequence performed by the digital camera 100 from the start of operation thereof until the end of operation thereof is described with reference to FIG. 12.

Figure 12:
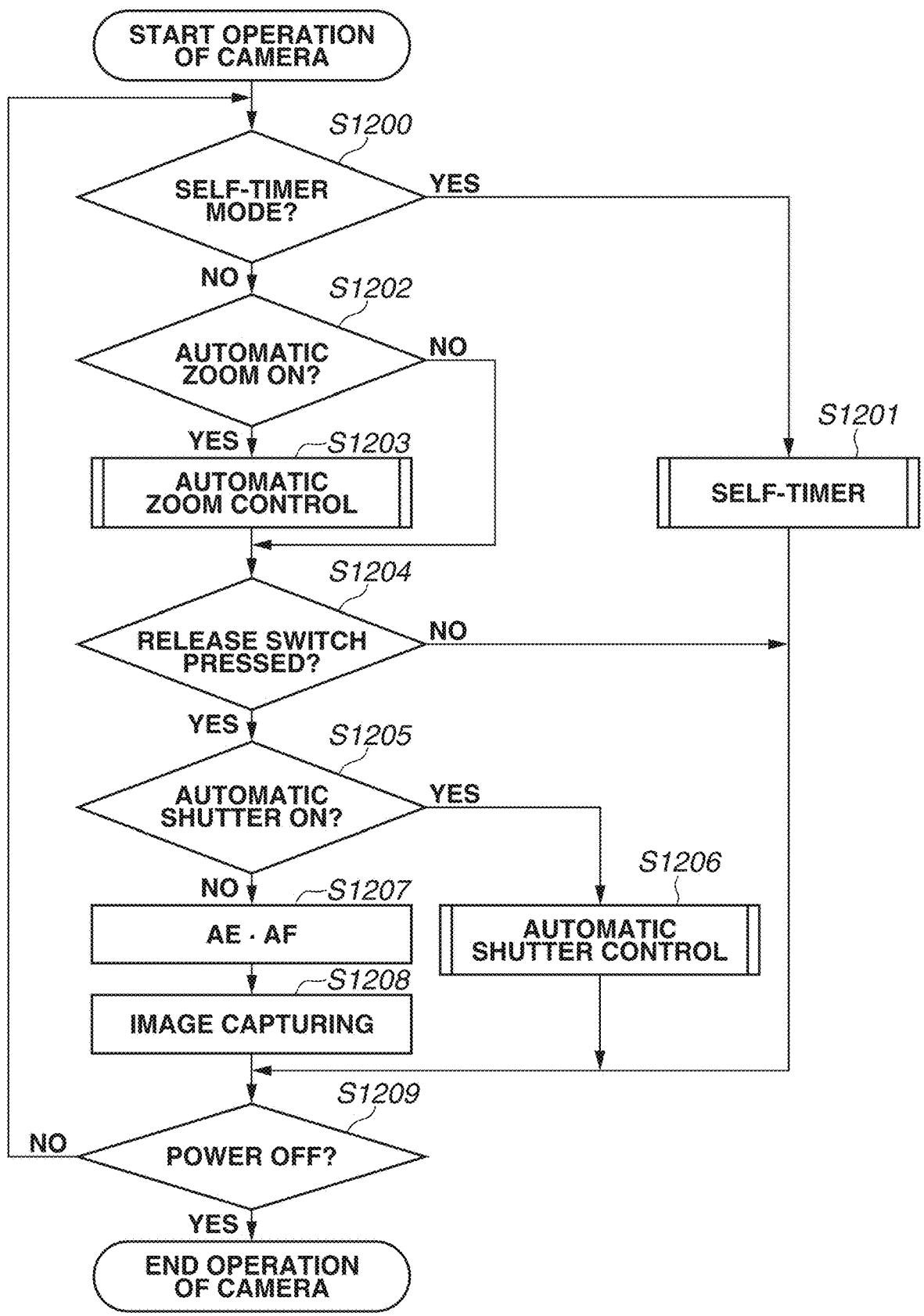
FIG. 12 is a flowchart illustrating an image capturing sequence performed from the time of activation of the digital camera to the time of ending thereof.

When the power button of the operation unit 117 is pressed, the digital camera 100 starts up, so that the image capturing sequence illustrated in the flowchart of FIG. 12 is started by the system control unit 114.

First, in step S1200, the system control unit 114 determines whether the mode set in the digital camera 100 is self-timer mode. If it is determined that the mode set in the digital camera 100 is self-timer mode (YES in step S1200), the processing proceeds to step S1201. In step S1201, the system control unit 114 performs the self-timer processing described with reference to FIGS. 3A to 3C to FIG. 11. On the other hand, if, in step S1200, it is determined that the mode set in the digital camera 100 is not self-timer mode (NO in step S1200), the processing proceeds to step S1202 for performing processing for an ordinary image capturing mode. In the ordinary image capturing mode, the digital camera 100 performs image capturing processing at timing when an image capturing instruction (pressing of the release switch) has been received from the user.

In step S1202, the system control unit 114 determines whether the automatic zoom function is set in an ON state. If it is determined that the automatic zoom function is set in an ON state (YES in step S1202), the processing proceeds to step S1203 for performing automatic zoom processing. If it is determined that the automatic zoom function is not set in an ON state (NO in step S1202), the processing proceeds to step S1204.

In step S1203, the system control unit 114 performs automatic zoom processing which is to be performed when the mode set in the digital camera 100 is not self-timer mode. Details of the automatic zoom processing in this step are described below. After the automatic zoom processing is performed in step S1203, the processing proceeds to step S1204.

In step S1204, the system control unit 114 determines whether the release switch of the operation unit 117 has been pressed. If, in step S1204, it is determined that the release switch has been pressed (YES in step S1204), the processing proceeds to step S1205, and, if it is determined that the release switch has not been pressed (NO in step S1204), the processing proceeds to step S1209.

In step S1205, the system control unit 114 determines whether the automatic shutter function is set in an ON state. If it is determined that the automatic shutter function is set in an ON state (YES in step S1205), the processing proceeds to step S1206 for performing automatic shutter processing.

Figure 11:
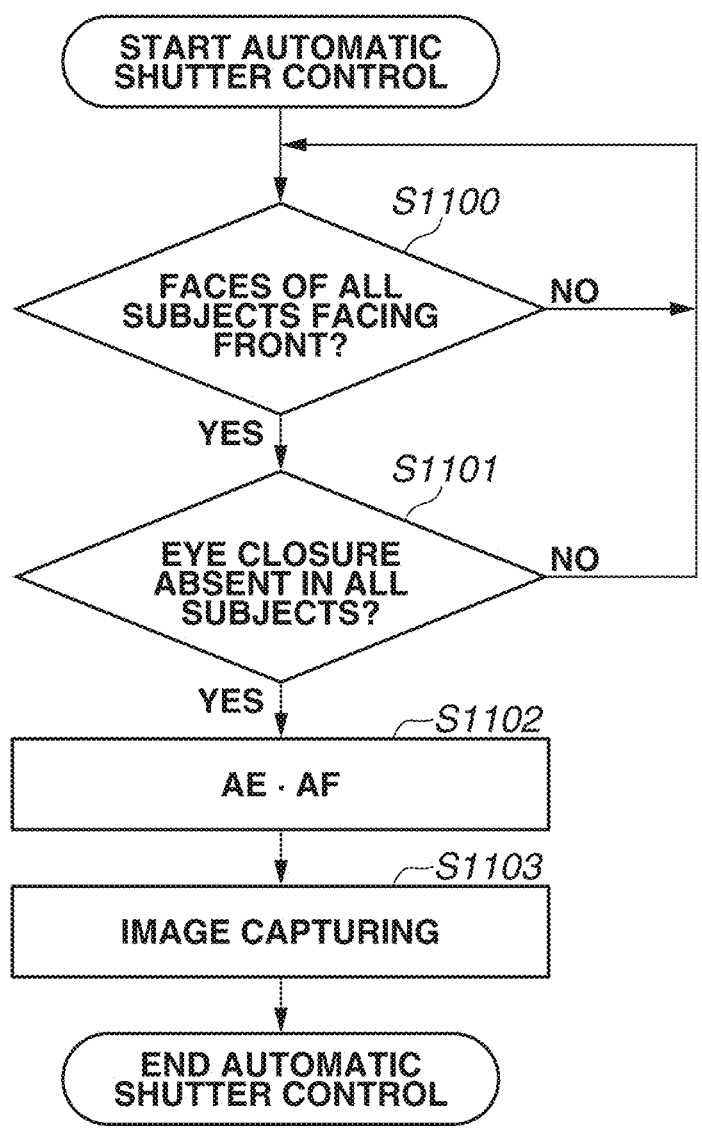
FIG. 11 is a flowchart illustrating processing for automatic shutter control.

The automatic shutter processing in step S1206 is processing similar to the processing in step S411 described with reference to FIG. 11, and, therefore, the description of details thereof is omitted here. On the other hand, if, in step S1205, it is determined that the automatic shutter function is not set in an ON state (NO in step S1205), the processing proceeds to step S1207 for performing an ordinary image capturing sequence.

In step S1207, the system control unit 114 performs automatic exposure adjustment (AE) and automatic focus adjustment (AF) in such a way as to optimize exposure and focus for a subject. These functions can be implemented by using known techniques as appropriate. After AE and AF are completed in step S1207, the processing proceeds to step S1208 for performing image capturing processing.

After any one of the self-timer processing in step S1201, the automatic shutter processing in step S1206, and the image capturing processing in step S1208 is ended, the processing proceeds to step S1209. In step S1209, the system control unit 114 determines whether the power button of the operation unit 117 has been pressed. If it is determined that the power button has been pressed (YES in step S1209), the system control unit 114 turns off the power source of the digital camera 100 and thus ends the processing. If it is determined that the power button has not been pressed (NO in step S1209), the processing returns to step S1200 for continuing the processing.

Figure 13:
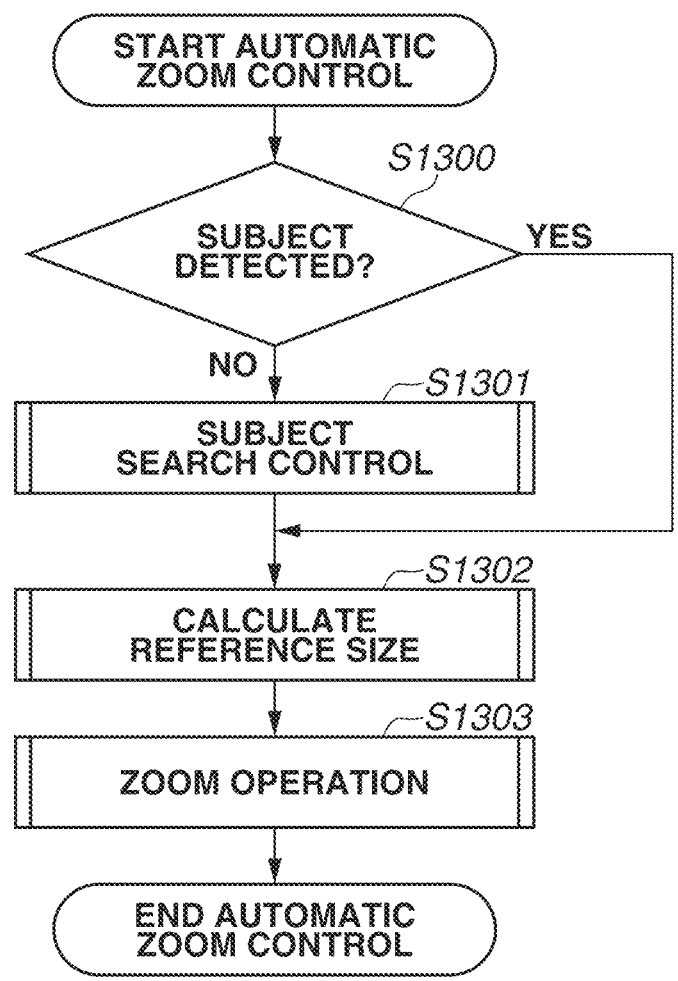
FIG. 13 is a flowchart illustrating processing for automatic zoom control performed in a case where the digital camera is not in self-timer mode.

The flow of the automatic zoom processing in step S1203 is described with reference to FIG. 13.

The automatic zoom processing in the automatic self-timer function described with reference to FIGS. 6A to 6C is processing performed on the assumption that, after placing the camera and preforming a release operation, the user moves to such a position that an image of the user appears in the image plane. On the other hand, the automatic zoom processing in step S1203 is performed on the assumption that the user performs an image capturing operation while manually gripping the camera, and, therefore, does not include, for example, processing for waiting the user to move to the above position. Further, in the automatic zoom processing in step S1203, a reference size is acquired based on the image acquired before an image capturing instruction by the user.

In step S1300, the system control unit 114 determines whether a subject has been detected by the subject detection unit 123. If it is determined that no subject has been detected (NO in step S1300), the processing proceeds to step S1301. In a case where no subject has been detected, it may be possible that the distance from the camera to a subject is long and, therefore, an image of the subject in the image plane is too small to be detected by the subject detection unit 123. Accordingly, in step S1301, the system control unit 114 performs processing for searching for a subject by performing a zoom-in operation up to a predetermined zoom position. The subject search control in step S1301 is similar to that in step S409 described with reference to FIG. 5, and details thereof are, therefore, omitted here.

After the subject search processing in step S1301 is completed or if, in step S1300, it is determined that a subject has been detected (YES in step S1300), the processing proceeds to step S1302. In step S1302, the automatic zoom control unit 124 acquires a reference size for automatic zoom. The reference size calculation in step S1302 is similar to that in step S605 described with reference to FIG. 7 to FIG. 9, and details thereof are, therefore, omitted here. After the reference size for automatic zoom is calculated, the processing proceeds to step S1303. In step S1303, the system control unit 114 performs a zoom operation for automatic zoom until the subject size detected by the subject detection unit 123 becomes equal to the reference size calculated in step S1302. The zoom operation in step S1303 is similar to that in step S606 described with reference to FIG. 10, and details thereof are, therefore, omitted here.

The present exemplary embodiment is configured to, in self-timer image capturing, change the image size of a subject by optical zoom based on information about the detected subject and change the range of an image to be recorded by electronic cropping. With regard to a range to be clipped and enlarged by electronic cropping, the present exemplary embodiment is configured to set a unique predetermined proportion with respect to an original image and determine such a cropping range that the detected subject falls within a predetermined range in the image plane, thus performing a zoom operation. Accordingly, in self-timer image capturing, the present exemplary embodiment is able to automatically adjust an image capturing range (a cropping range in the present exemplary embodiment) in such a manner that a subject falls within a predetermined range, while preventing or reducing a decrease in image quality.

<Modification Examples>

While, in the above-described exemplary embodiment, a configuration in which the disclosure is applied to an imaging apparatus which performs face detection has been described, the disclosure can also be applied to an imaging apparatus which performs body detection. In this case, such a configuration can determine a subject region using a result of the face detection, instead of acquiring the shoulder positions, head position, and body position using the position and size of a face frame.

Moreover, the above-described exemplary embodiment acquires, in step S703 or S704, the reference size for automatic zoom control based on the subject position closest to the periphery (the subject position ratio Rh or Rv in the horizontal direction or vertical direction) and the detected size of a subject. Then, the above-described exemplary embodiment performs control in such a manner that the detected size of a subject becomes equal to the reference size. However, such a configuration as to perform automatic zoom control using a reference position instead of the reference size can be employed. For example, in the determination processing in step S1000, S1002, or S1005, the configuration acquires the subject position closest to the periphery (Xsmax, Xsmin, Yhmax, Ybmin) with a predetermined period (for example, at intervals of one frame). Then, the configuration determines whether the subject size has reached the position of the edge of a range obtained by multiplying the cropping range by a predetermined proportion. Moreover, such a configuration as to acquire the subject position ratio (Rh or Rv) closest to the periphery with a predetermined period and determine whether the subject position ratio has become 1 can also be employed.

Other Embodiments

While various exemplary embodiments of the present disclosure have been described above, the application of the present disclosure is not limited to an apparatus mainly intended for image capturing, such as a camera. The disclosure can be applied to any apparatus in which an imaging apparatus is incorporated or which is externally connected to an imaging apparatus, such as a mobile phone, a personal computer (for example, laptop type, desktop type, and tablet type), and a gaming machine. Accordingly, an "imaging apparatus" in the present specification is intended to include any electronic apparatus having an image capturing function.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An apparatus for recording a first image output from a sensor based on an instruction from a user, the apparatus comprising:
    at least one processor; and
    a memory coupled to the at least one processor, the memory having instructions that, when executed by the processor, performs operations as:
    a detection unit configured to detect a subject from a second image output from the sensor before capturing the first image;
    a zoom control unit configured to set a parameter based on the detected subject and to perform automatic zoom control using the parameter;
    an image capturing control unit configured to control image capturing processing of the first image;
    a setting unit configured to set a cropping range to an area including the detected subject in the first image;
    a cropping unit configured to obtain a third image by cropping the set cropping range from the recorded first image; and
    a recording control unit configured to control a recording of the third image cropped by the cropping unit,
    wherein, in a first mode, the detection unit detects the subject from the second image which is acquired after a first condition is satisfied after the instruction, and the zoom control unit performs the automatic zoom control using the parameter set based on the subject detected from the second image,
    wherein the image capturing control unit determines whether a second condition different from the first condition is satisfied after the zoom control unit performs the automatic zoom control, and
    wherein the image capturing control unit performs the image capturing processing of the first image in a case where the image capturing control unit determines that the second condition is satisfied after the zoom control unit performs the automatic zoom control.

2. The apparatus according to claim 1, wherein the first condition is a predetermined time elapsing from the instruction.

3. The apparatus according to claim 1,
    wherein the first condition is an increase in number of subjects, and
    wherein the increase in number of subjects is detected by the detection unit.

4. The apparatus according to claim 3, wherein the detection unit detects the increase in number of subjects by periodically detecting a subject from the second image, and uses, as the second image, an image in which it is detected that the number of subjects has increased than last time.

5. The apparatus according to claim 1, wherein the zoom control unit performs the automatic zoom control based on temporary parameter data for a time until the parameter is set based on the subject detected from the second image.

6. The apparatus according to claim 1, wherein the parameter is at least one of a reference size of the subject and a reference position of the subject.

7. The apparatus according to claim 1,
    wherein the parameter is a reference size of the subject, and
    wherein a size of the detected subject comes close to the reference size according to the automatic zoom control performed by the zoom control unit.

8. The apparatus according to claim 1,
    wherein the parameter is a reference position of the subject, and
    wherein the position of the detected subject comes close to the reference position according to the automatic zoom control performed by the zoom control unit.

9. The apparatus according to claim 1, wherein the zoom control unit sets the parameter used for the automatic zoom control based on a size of the cropping range.

10. The apparatus according to claim 1, wherein the zoom control unit sets the parameter used for the automatic zoom control based on a size of the cropping range and a size of the detected subject.

11. The apparatus according to claim 1, wherein the zoom control unit sets the parameter used for the automatic zoom control based on a size of the cropping range and a position of the detected subject.

12. The apparatus according to claim 1, wherein a size of the cropping range is determined based on a recording size to be recorded by the recording unit.

13. The apparatus according to claim 1, wherein the setting unit is capable of changing a size of the cropping range according to at least one of a position and a size of the detected subject.

14. The apparatus according to claim 13, wherein, when determining that, even if a zoom position is set to a wide-angle end, the detected subject is not included in the cropping range, the setting unit increases the size of the cropping range.

15. The apparatus according to claim 1,
    wherein the apparatus further has a second mode in which image capturing is performed at timing when an image capturing instruction is received, and wherein, in the second mode, the detection unit detects a subject from a fourth image which is acquired before the image capturing instruction, and the zoom control unit performs the automatic zoom control using the parameter set based on the subject detected from the fourth image.

16. The apparatus according to claim 1, wherein the image capturing control unit does not perform the image capturing processing of the first image even in a case where the second condition is satisfied before the automatic zoom control is performed.

17. The apparatus according to claim 1, wherein the zoom control unit adjusts a size of the detected subject, and the cropping unit adjusts a position of the detected subject.

18. The apparatus according to claim 1, wherein the zoom control unit performs enlargements around an optical axis.

19. The apparatus according to claim 1, wherein the image capturing control unit determines whether the second condition is satisfied based on a detection result of the detection unit.

20. A method for an apparatus for recording a first image output from a sensor based on an instruction from a user, the method comprising:
- detecting a subject from a second image output from the sensor before capturing the first image;
- setting a parameter based on the detected subject;
- performing automatic zoom control using the parameter;
- performing image capturing processing of the first image;
- setting a cropping range to an area including the detected subject in the first image;
- cropping the cropping range from the recorded first image; and
- recording the third image which is obtained by the cropping,
- wherein, in a first mode, the second image is acquired after a first condition is satisfied after the instruction, and the parameter is set based on the subject detected from the second image,
- wherein whether a second condition different from the first condition is satisfied after the automatic zoom control is performed, and
- wherein the image capturing processing of the first image is performed in a case where it is determined that the second condition is satisfied after the automatic zoom control is performed.

21. A non-transitory computer-readable storage medium storing computer-executable instructions that, when executed by a computer, cause the computer to perform a method for controlling an apparatus for recording a first image output from a sensor based on an instruction from a user, the method comprising:
- detecting a subject from a second image output from the sensor before capturing the first image;
- setting a parameter based on the detected subject;
- performing automatic zoom control using the parameter;
- performing image capturing processing of the first image;
- setting a cropping range to an area including the detected subject in the first image;
- cropping the cropping range from the recorded first image; and
- recording the third image which is obtained by the cropping,
- wherein, in a first mode, the second image is acquired after a first condition is satisfied after the instruction, and the parameter is set based on the subject detected from the second image,
- wherein whether a second condition different from the first condition is satisfied after the automatic zoom control is performed, and
- wherein the image capturing processing of the first image is performed in a case where it is determined that the second condition is satisfied after the automatic zoom control is performed.

* * * * *